(12) United States Patent
Zou

(10) Patent No.: US 7,949,255 B2
(45) Date of Patent: May 24, 2011

(54) SYSTEM, DEVICE AND METHOD FOR TRANSPORTING SIGNALS THROUGH PASSIVE OPTICAL NETWORK

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 824 days.

(21) Appl. No.: 11/864,789

(22) Filed: Sep. 28, 2007

(65) Prior Publication Data

US 2008/0095535 A1    Apr. 24, 2008

(30) Foreign Application Priority Data

Oct. 8, 2006    (CN) .......................... 2006 1 0139090

(51) Int. Cl.
*H04B 10/20* (2006.01)
*H04J 14/00* (2006.01)
(52) U.S. Cl. ............... 398/58; 398/63; 398/64; 398/66; 398/67; 398/168; 398/173; 398/182; 398/202
(58) Field of Classification Search ............. 398/58–64, 398/66–72, 86, 166–168, 173, 182, 202
See application file for complete search history.

(56) References Cited

U.S. PATENT DOCUMENTS

| | | | |
|---|---|---|---|
| 5,841,760 A | | 11/1998 | Martin et al. |
| 7,369,768 B2* | | 5/2008 | Sakamoto et al. ............. 398/58 |
| 7,738,359 B1* | | 6/2010 | Suryaputra et al. ........... 370/216 |
| 2004/0202484 A1* | | 10/2004 | Shraga et al. ................. 398/168 |
| 2004/0208631 A1 | | 10/2004 | Song et al. |
| 2005/0008013 A1 | | 1/2005 | Jamieson et al. |
| 2005/0044186 A1* | | 2/2005 | Petrisor ........................ 709/219 |
| 2007/0211763 A1* | | 9/2007 | Solomon et al. .............. 370/498 |

FOREIGN PATENT DOCUMENTS

| | | |
|---|---|---|
| CN | 1734990 A | 2/2006 |
| EP | 1467590 A1 | 10/2004 |
| WO | WO 2005/099298 A1 | 10/2005 |
| WO | WO 2008/043227 A1 | 4/2008 |

OTHER PUBLICATIONS

Guo: "The Design of Subrate Transparent Multiplexer Based on G.709", Study on Optical Communications, vol. 4, 2005, pp. 18-20.*
Lang et al: "Study on GPON Technology", Electronics and Computers, Dec. 2005, pp. 129-134.*

(Continued)

*Primary Examiner* — Li Liu
(74) *Attorney, Agent, or Firm* — Leydig, Voit & Mayer, Ltd.

(57) ABSTRACT

A system for transporting signals through PON, including a device for transporting optical network signals and a device for transporting optical line signals, wherein: the device for transporting optical network signals is adapted to map upstream optical signals with a PON frame format to upstream optical channel data unit signals, to convert into upstream signals with an optical channel transport unit format, and to transport to the device for transporting optical line signals through OTN; and to perform corresponding downstream processing; the device for transporting optical line signals is adapted to convert the upstream signals into upstream optical channel data unit signals, to de-map to upstream optical signals with a PON frame format, and to transport to an optical line terminal; and to perform corresponding downstream processing. The invention further discloses relevant devices and methods.

15 Claims, 21 Drawing Sheets

OTHER PUBLICATIONS

PCT Written Opinion of the International Searching Authority (Aug. 23, 2007).
State Intellectual Property Office of the People's Republic of China, Examination Report in Chinese Patent Application No. 200610139090.8 (Dec. 18, 2009).
European Search Report (Jan. 31, 2008).
European Office Action (Aug. 18, 2008).
Guo, "The Design of Subrate Transparent Multiplexer Based on G.709," Study on Optical Communications, pp. 18-20 (Sum. No. 130) (Apr. 2005).
Lang, "GPON Technology Research," CompuTech, No. 12 2005 pp. 129-134.
Davey et al., "Designing a $21^{st}$ and $22^{nd}$ Century Fibre Broadband Access Network," BT Technology Journal, Kluwer Academic Publishers, vol. 24, No. 2, pp. 57-64 (Apr. 1, 2006).
(ITU-T) International Telecommunication Union, "Series G: Transmission Systems and Media, Digital Systems and Networks, Digital Networks—Optical Transport Networks, Architecture of Optical Transport Networks," G.872 (Nov. 2001).
(ITU-T) International Telecommunication Union, "Series G: Transmission Systems and Media, Digital Systems and Networks, Digital Terminal Equipments—Other Terminal Equipment, Characteristics of Optical Transport Network Hierarchy equipment Functional Blocks," G.798 (Jan. 2002).
(ITU-T) International Telecommunication Union, "Series G: Transmission Systems and Media, Digital Systems and Networks, Digital Terminal Equipments—General, Series Y: Global Information Infrastructure and Internet Protocol Aspects, Internet Protocol Aspects—Transport, Interfaces for the Optical Transport Network (OTN)," G.709/Y.1331 (Mar. 2003).
"G.984.2—Gigabit-capable Passive Optical Networks (GPON): Physical Media Dependent (PMD) layer specification," Series G: Transmission Systems and Media, Digital Systems and Networks, Mar. 2003, International Telecommunication Union, Geneva, Switzerland.
"G.984.3—Gigabit-capable Passive Optical Networks (G PON): Transmission convergence layer specification," Series G: Transmission Systems and Media, Digital Systems and Networks, Feb. 2004, International Telecommunication Union, Geneva, Switzerland.

* cited by examiner

| Column Row | 1 ... 7 | 8 ... 14 | 15 | 16 | 17 ... 3824 | 3825 ... 4080 |
|---|---|---|---|---|---|---|
| 1 | FAS | OTU OH | | | | |
| 2 | ODU OH | | OPU OH | | OPU | FEC |
| 3 | | | | | | |
| 4 | | | | | | |

FIG.2

SYSTEM, DEVICE AND METHOD FOR TRANSPORTING SIGNALS THROUGH PASSIVE OPTICAL NETWORK

This application claims a priority from Chinese Patent Application No. 200610139090.8, filed with the Chinese Patent Office on Oct. 8, 2006, titled "SYSTEM AND METHOD FOR TRANSPORTING SIGNALS THROUGH PASSIVE OPTICAL NETWORK", contents of which are incorporated herein by reference in its entirety.

FIELD OF THE INVENTION

The present invention relates to the field of transporting optical signals, and in particular to a system, device and method for transporting signals through a Passive Optical Network (PON).

BACKGROUND OF THE INVENTION

As a broadband optical access technology, the PON features a point-to-multipoint physical topology, which consists of an Optical Line Terminal (OLT), an Optical Distribution Network (ODN) and multiple Optical Network Units (ONUs). The multiple ONUs share optical resource and an OLT port. The ODN is connected passively with an OLT and one or more ONUs. An optical branch point in the ODN needs no active nodal device but a passive optical splitter. Consequently, the PON has such advantages as sharing bandwidth resource, saving investment of machine room, a high security of device, rapid networking and a low cost of comprehensive networking.

As the demands for broadband services increases, PON technologies are developing continuously, such as from the Asynchronous Transfer Mode (ATM)-based PON (ATM-PON, abbreviated as APON) to the Broadband Passive Optical Network (abbreviated as BPON) and further from the Ethernet-PON (abbreviated as EPON) to the Gigabit-capable Passive Optical Networks (G-PON, abbreviated as GPON) with the increase of transport bandwidth. The bandwidth of the existing GPON can be up to 2.5 Gbits/second (bps) for downstream and optional various rates of 2.5 Gbps, 1.5 Gbps, and 622 Mbps for upstream.

The GPON is a PON system initiated by the Full Service Access Network (FSAN) organization and established by the ITU-T Standardization organization. The GPON has the following features in terms of its functionality and performance: it can flexibly provide multiple symmetric or asymmetric upstream and downstream rates, such as 1.244 GBPS for upstream and 2.488 GBPS for downstream; a splitting rate of the system may be 1:16, 1:32, 1:64 and even 1:128, and the upstream and downstream rates are related with the Forward Error Correction (FEC) supported by the GPON; the GFP may be adaptable to any data service; it can well support transport for TDM service data, and provide a good guarantee for timing performance; it provides a perfect Operation, Administration, Maintenance and Provisioning (OAM&P) capability.

The GPON, as an access network, has numerous advantages; an appropriate transport system, however, shall be needed for cooperation with the GPON. An Optical Transport Network (OTN) is a highly reliable and interoperable high speed optical network, and can be taken as a backbone network or a metropolitan area network for cooperation with the GPON.

With respect to the OTN network, a client signal over the OTN is transported in the following three manners.

(1) Constant Bit Rate (abbreviated as CBR), i.e. CBR2.5G, CBR10G or CBR40G signals are mapped into an Optical channel Payload Unit (abbreviated as OPUk), in which CBR2.5G is a signal of a constant bit rate 2488320 kbit/s±20 ppm.

(2) Asynchronous Transfer Mode (abbreviated as ATM), i.e. ATM cells are multiplexed into fixed bit streams which match the payload capacity of an Optical channel Transport Unit (OPUk), and the bit streams are mapped into the OPUk. In multiplexing, the rate is adjusted through inserting idle cells or discarding cells. Information of the ATM cells should be scrambled prior to mapping.

(3) General Framing Procedure (abbreviated as GFP), i.e. in mapping a GFP frame, an idle frame is inserted during encapsulation to achieve a continuous bit stream which matches the OPUk, in which scrambling should also be performed. Some other signals may be mapped into the OPUk, such as a client signal, a test signal, a common client bit stream signal, etc.

Considering that the GPON and the OTN are different transport systems with different frame formats and overheads, and are applied in different scenarios, a networking way has been provided in the prior art. As illustrated in FIG. 1, which shows an architectural schematic diagram of GPON and OTN networking in the prior art, in a passive Optical Distribution Network (ODN), a user-side device (e.g. a computer terminal, a phone set, a television set) is connected with ONU 1, and is capable of transmitting and receiving a service signal.

In an upstream direction, when the user-side device transmits a service signal to the ONU1 through an Ethernet frame (e.g. a Media Access Control (MAC) frame), the ONU 1 can encapsulate the MAC frame into a GEM frame (a PON internal frame generated by using a GPON encapsulation method), and then the GEM frame is mapped into a payload area of an upstream optical burst packet, which is then added with a Physical Layer Overhead upstream (abbreviated as PLOu), a Physical Layer Sequence upstream (abbreviated as PLSu), a Physical Layer OAM upstream (abbreviated as PLOAMu) and a Dynamic Bandwidth Report upstream (abbreviated as DBRu), to compose an upstream burst timeslot stream for transport in an upstream line. The burst timeslot stream is a GPON Transmission Convergence (GTC), and is located in a Transmission Container (abbreviated as T-CONT). It shall be noted that the GPON is a specific example of the PON. With respect to the GPON, the burst timeslot stream transmitted out from the ONU1 is signals in a GTC format. With respect to the general PON, the burst timeslot stream transmitted out from the ONU1 is signals in a PON frame format.

An OLT 2 is connected directly with the ONU1. When receiving the upstream burst timeslot stream, the OLT 2 extracts the PLOu, then extracts the GEM frame from the payload area, and removes the GEM encapsulation, thus recovering the original service signals in the MAC frame format. When a GFP adaptation protocol is adopted in an OTN 3, the OLT 2 has to firstly encapsulate the original service signals through the GFP, and then transmits the encapsulated service signals to an optical transport device 4 and further to another optical transport device 5 in the OTN 3. The optical transport device 5 transmits the service signals to a network serving party, i.e. a digital video network, the Internet, or a Public Switched Telephone Network (abbreviated as PSTN).

The processing in a downstream direction is similar to that in the upstream direction, and therefore is not described again. The inventors have recognized when making the present invention that for the transport procedure of service signals provided in the prior art, the GEM is just an internal adaptation protocol of the GPON, and is generated and terminated only between the ONU and OLT, while the GFP is just an internal adaptation protocol of the OTN network, and is greatly different from the GEM in terms of their formats and functionalities, thus an integration of network elements is difficult, and even with a physical integration, they may be logically independent from each other, which will be adverse to a mutual integration of a transport network with an access network.

Further, with respect to the networking way, the service signals encapsulated into the GEM frame can be of an access to the OTN only after they are recovered into the original service signals through the OLT, and the GPON is disadvantageous in a short transport distance and support for a limited number of users, a large number of OLTs have to be configured separately in sites which are located very dispersedly, thereby resulting in a very high cost of network operation and maintenance.

SUMMARY OF THE INVENTION

Embodiments of the present invention provide a system, device and method for transporting signals through a passive optical network, which enables signals in a PON frame format to transparently pass through an OTN, thereby achieving end-to-end transport and termination.

An embodiment of the present invention provides a device for transporting optical network signals, including: an upstream conversion interface module, adapted to convert upstream optical signals with a PON frame format as received into upstream data streams; an upstream optical channel data unit mapping module, adapted to map the upstream data streams from the upstream conversion interface module to upstream optical channel data unit signals; an upstream optical channel transport unit module, adapted to convert the upstream optical channel data unit signals from the upstream optical channel data unit mapping module into upstream signals with an optical channel transport unit format, and to transport the upstream signals with an optical channel transport unit format to an optical transport network.

A further embodiment of the present invention provides a device for transporting optical network signals, including: a downstream optical channel transport unit module, adapted to convert downstream signals with an optical channel transport unit format from an optical transport network into downstream optical channel data unit signals; a downstream optical channel data unit mapping module, adapted to de-map the downstream optical channel data unit signals from the downstream optical channel transport unit module to downstream frame data streams with a PON frame format; a downstream conversion interface module, adapted to convert the downstream frame data streams from the downstream optical channel data unit mapping module into downstream optical signals, and to transport the downstream optical signals to a PON.

A further embodiment of the present invention provides a device for transporting optical line signals, including: a downstream conversion interface module, adapted to convert downstream signals as received into downstream frame data streams with a PON frame format; a downstream optical channel data unit mapping module, adapted to map the downstream frame data streams from the downstream conversion interface module to downstream optical channel data unit signals; a downstream optical channel transport unit module, adapted to convert the downstream optical channel data unit signals from the downstream optical channel data unit mapping module into downstream signals with an optical channel transport unit format, and to transport the downstream signals with an optical channel transport unit format to an optical transport network.

A further embodiment of the present invention provides a device for transporting optical line signals, including: an upstream optical channel transport unit module, adapted to upstream signals with an optical channel transport unit format from an optical transport network into upstream optical channel data unit signals; an upstream optical channel data unit mapping module, adapted to de-map the upstream optical channel data unit signals from the upstream optical channel transport unit module to upstream data streams with a PON frame format; an upstream conversion interface module, adapted to convert the upstream data streams from the upstream optical channel data unit mapping module into upstream optical signals required for transport to an optical line terminal or upstream service signals required for transport to a network serving party.

A further embodiment of the present invention provides a system for transporting signals through a passive optical network, including a device for transporting optical network signals and a device for transporting optical line signals, which are connected through an optical transport network, wherein: the device for transporting optical network signals is adapted to map upstream optical signals with a PON frame format as received, as client signals, to upstream optical channel data unit signals, to convert the upstream optical channel data unit signals into upstream signals with an optical channel transport unit format, and to transport the upstream signals with an optical channel transport unit format to the device for transporting optical line signals through the optical transport network; and to process downstream signals in a reverse direction to the upstream processing; the device for transporting optical line signals is adapted to convert the upstream signals with an optical channel transport unit format from the optical transport network into upstream optical channel data unit signals, to de-map the upstream optical channel data unit signals to upstream optical signals with a PON frame format, and to transport the upstream optical signals with a PON frame format to an optical line terminal; and to process downstream signals in a reverse direction to the upstream processing.

A further embodiment of the present invention provides a system for transporting signals through a passive optical network, including a device for transporting optical network signals and a device for transporting optical line signals connected through an optical transport network, wherein: the device for transporting optical network signals is adapted to map upstream optical signals with a PON frame format as received, as client signals, into upstream optical channel data unit signals, to convert the upstream optical channel data unit signals into upstream signals with an optical channel transport unit format, and to transport the upstream signals with an optical channel transport unit format to the device for transporting optical line signals through the optical transport network; and to process downstream signals in a reverse direction to the upstream processing; the device for transporting optical line signals is adapted to convert the upstream signals with the optical channel transport unit format from the optical transport network into upstream optical channel data unit signals, to de-map the upstream optical channel data unit signals to upstream PON internal frames, to recover upstream service signals from the upstream PON internal frames, and to transport the upstream service signals to a network serving party; and to process downstream signals in a reverse direction to the upstream processing.

A further embodiment of the present invention provides a method for transporting signals through a passive optical network, including: mapping upstream optical signals with a PON frame format as received, as client signals, to upstream optical channel data unit signals, converting the upstream optical channel data unit signals into upstream signals with an optical channel transport unit format, and transporting the upstream signals with an optical channel transport unit format through an optical transport network; converting the upstream signals with an optical channel transport unit format received from the optical transport network into upstream optical channel data unit signals, de-mapping the upstream optical channel data unit signals to upstream optical signals with a PON frame format, and transporting the upstream optical signals with a PON frame format to an optical line terminal.

A further embodiment of the present invention provides a method for transporting signals through a passive optical network, including: mapping upstream optical signals with a PON frame format as received, as client signals, to upstream optical channel data unit signals, converting the upstream optical channel data unit signals into upstream signals with an optical channel transport unit format, and transporting the upstream signals with an optical channel transport unit format through an optical transport network; converting the upstream signals with an optical channel transport unit format received from the optical transport network into upstream optical channel data unit signals, de-mapping the upstream optical channel data unit signals to upstream PON internal frames, recovering upstream service signals from the PON internal frames, and transporting the upstream service signals to a network serving party.

A further embodiment of the present invention provides a method for transporting signals through a passive optical network, including: mapping downstream optical signals with a PON frame format from an optical line terminal, as client signals, to downstream optical channel data unit signals, converting the downstream optical channel data unit signals into downstream signals with an optical channel transport unit format, and transporting the downstream signals with an optical channel transport unit format through an optical transport network; converting the downstream signals with an optical channel transport unit format received from the optical transport network into downstream optical channel data unit signals, de-mapping the downstream optical channel data unit signals to downstream optical signals with a PON frame format, and transporting the downstream optical signals with a PON frame format to an optical network unit.

A further embodiment of the present invention provides a method for transporting signals through a passive optical network, including: adapting downstream service signals from a network serving party to downstream PON internal frames, mapping the downstream PON internal frames to downstream optical channel data unit signals, converting the downstream optical channel data unit signals into downstream signals with an optical channel transport unit format, and transporting the downstream signals with an optical channel transport unit format through an optical transport network; converting the downstream signals with an optical channel transport unit format received from the optical transport network into downstream optical channel data unit signals, de-mapping the downstream optical channel data unit signals to downstream optical signals with a PON frame format, and transporting the downstream optical signals with a PON frame format to an optical network unit.

As can be seen from the technical solutions according to the embodiments of the present invention, the signals with a PON frame format are taken as OTN client signals and directly encapsulated, in other words, the signals with a PON frame format are mapped to the optical channel data unit signals, and the optical channel data unit signals are transported in the OTN. Therefore, the signals with a PON frame format can really pass through the OTN, thereby passing through the OTN transparently.

BRIEF DESCRIPTION OF THE DRAWINGS

FIG. 2 is a schematic diagram of a standard frame format adopted in digital wrapper technology;

DETAILED DESCRIPTION OF THE INVENTION

Figure 1:
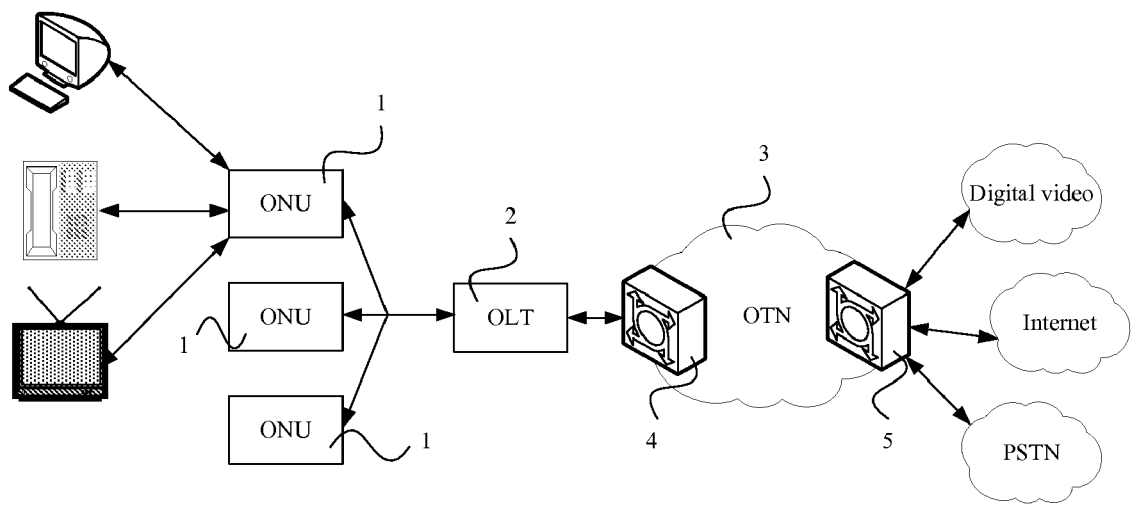
FIG. 1 is a structural schematic diagram of GPON and OTN networking in the prior art.

Technical solutions according to respective embodiments of the present invention will be described as follows in detail with reference to the drawings.

Embodiments of the present invention disclose a PON and OTN networking way, and in conjunction with digital wrapper technology in the series of OTN recommendations, and take signals in the PON (i.e. a signal in a PON frame format) as client signals in the OTN network, thus enabling the PON signals to transparently pass through the OTN network (the "transparently pass through" means that frame formats or byte bits of input and output signals have not been changed) and reducing an integration difficulty resulted from differences of the client signals in a PON and an OTN in terms of their formats and functionalities. The technical solutions as disclosed in the embodiments of the present invention may be applied in both a GPON and a PON (such as an APON and an EPON), and in a specific implementation, signals in the PON frame format are transported as client signals over the OTN network, except that there may be only a difference in encapsulation within PON network.

First, the digital wrapper technology is described. This technology defines a special frame format in which a client signal is encapsulated into a payload unit of a frame. Overhead (abbreviated as OH) bytes for OAM&P are provided in a frame header, and Forward Error Correction (abbreviated as FEC) bytes are provided in a frame trail.

A standard frame format adopted by the digital wrapper technology is as illustrated in FIG. 2. As can be seen, a standard frame adopted by the digital wrapper is of a frame format of 4 rows and 4080 columns. 16 columns in the header are overhead bytes, 255 columns in the trail are FEC check bytes, and middle 3808 columns are Optical channel Payload Units (abbreviated as OPUs). Among the overhead bytes in the header, in line 1, columns 1 to 7 are Frame Alignment Signal (abbreviated as FAS) bytes, and bytes 8 to 14 are overhead bytes of the $k^{th}$ Optical channel Transport Unit (abbreviated as OTUk), in which different values of k correspond to transport modes with different rates; and in lines 2 to 4, columns 1 to 14 are overhead bytes of a k-level Optical channel Data Unit (abbreviated as ODUk), and columns 15 and 16 are overhead bytes of the $k^{th}$ Optical channel Payload Unit (abbreviated as OTUk). The seventh FAS byte is a Multi-Frame Alignment Signal (abbreviated as MFAS), adapted to indicate an overhead assignment when multiple user service signals are borne in a time division multiplexing manner.

The OTUk overhead bytes provide a function of monitoring the status of signals transported between regeneration points of Re-amplification, Reshaping and Retiming (abbreviated as "3R") in the OTN, including three parts: a Section Monitoring (SM) overhead byte, a overhead byte of a communication channel between GCC0 terminals, and a reserved (RES) byte.

The ODUk overhead bytes provide concatenation connection monitoring, end-to-end channel monitoring, and client signal adaptation enabled through the OPUk. The ODUk provides various overhead bytes (columns 1 to 14 in lines 2 to 4) for accomplishing the above functions, including a Path Monitoring (abbreviated as PM) overhead, a Tandem Connection Monitoring (abbreviated as TCM) overhead, General Communication Channel (GCC) bytes GCC1 and GCC2 overheads, an Auto-Protection Switching/Protection Control Channel (abbreviated as or APS/PCC) overhead, Fault Type Fault Location (abbreviated as FTFL) information, an overhead byte for an experiment (abbreviated as EXP), etc.

The OPUk overhead bytes include a Payload Structure Identifier (abbreviated as PSI), an adjusting byte, a Mapping Specific Overhead, etc. With an MFAS indicator, the PSI corresponds respectively to possible values 0-255. The byte 0 is an indicator of a client signal type (Payload Type, abbreviated as PT), and the rest are Reserved (abbreviated as RES) bytes for a future extended use.

Figure 3:
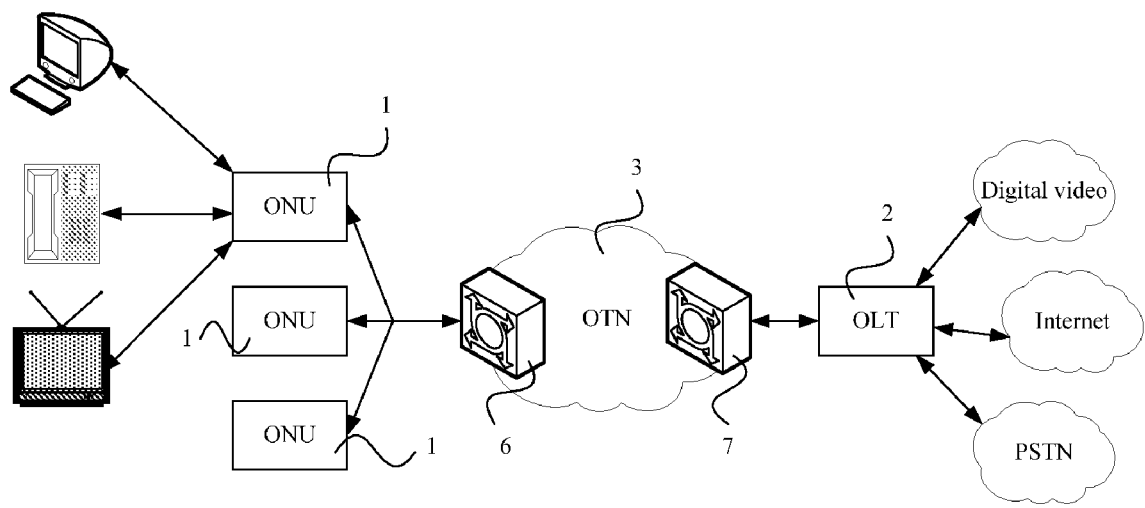
FIG. 3 is a structural schematic diagram of a system for transporting signals through a passive optical network according to the present invention.

An embodiment of the networking way according to the present invention is as illustrated in FIG. 3, which shows a structural schematic diagram of an embodiment of a system for transporting signals through a passive optical network according to the present invention. The system includes one or more optical network units (ONU) 1, an optical line terminal (OLT) 2, and a device for transporting optical network signals 6 and a device for transporting optical line signals 7 in an OTN network 3. Being different from the prior art, the ONU 1 is not connected directly with the OLT 2, but transports signals in the OTN through the device for transporting optical network signals 6 and the device for transporting optical line signals 7 and then transmits to the OLT 2.

Figure 4:
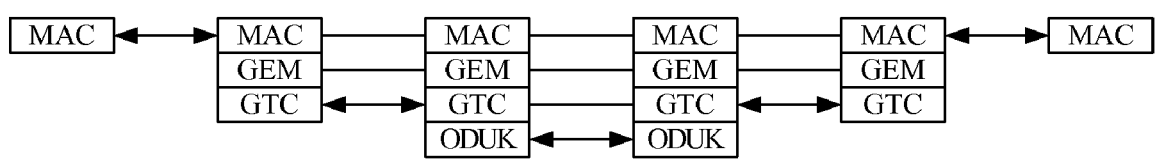
FIG. 4 is a schematic diagram of changes in a frame format of service signals during transport in the present invention.

With respect to the above system for transporting signals through a passive optical network, a procedure of processing service signals is as illustrated in FIG. 4, which shows a schematic diagram of changes of a frame structure of service signals being transported in the transport system shown in FIG. 3. After receiving upstream service signals in an MAC frame format, the ONU 1 maps the upstream service signals to PON internal frames, which may be GPON GEM frames, EPON Ethernet frames or TDM-PON internal frames. Then the PON internal frames become upstream burst packets, and the upstream optical signals (that is, the upstream optical signals with a PON frame format) are transported in an assigned upstream timeslot location (i.e. T-CONT) to the device for transporting optical network signals 6. The device for transporting optical network signals 6 takes all received upstream optical signals from the ONUs as bit data streams, performs an optical-to-electric conversion and reception pre-processing, and then maps them into an ODUK (i.e. the signals in the PON frame format are mapped as client signals into the ODUK). Subsequent to being converted into the OTUK, the signals are transported to the device for transporting optical line signals 7 through the OTN. Upon receiving the optical signals encapsulated into the ODUK frame, the device for transporting optical line signals 7 performs a de-mapping to obtain the bit data streams (i.e. the upstream data streams with the PON frame format), and then transports them to the OLT 2. The OLT 2 first de-maps the bit data streams to obtain the PON internal frames, finally recovers the MAC frames from the PON internal frames, and transport the MAC frames to a network serving party through an Ethernet interface. A downstream direction is opposite to the upstream direction, but they share the same principle that the layer-by-layer encapsulation enables transparent passing through the OTN network.

With respect to a GPON network, after being mapped to the GEM frames in the ONU 1, the upstream service signals become the upstream burst packets in accordance with an upstream frame format of G984, and the upstream optical signals in the GTC frame format are transported in the assigned upstream timeslots location (T-CONT) to the device for transporting optical network signals 6. The device for transporting optical network signals 6 takes all received upstream optical signals in the GTC frame format from the ONUs as GTC bit data streams, performs an optical-to-electric conversion and reception preprocessing, and then maps them into an ODUK. Upon receiving the optical signals encapsulated into the ODUK frame, the device for transporting optical line signals 7 performs a de-mapping to obtain the GTC bit data streams, and transports to the OLT 2. The OLT 2 first de-maps the GTC bit data streams to the GEM frames, finally recovers the MAC frames from the GEM frames, and transports the MAC frames to a network serving party through an Ethernet interface.

In order to implement the above procedure, the present invention discloses several specific implementing solutions for the embodiment of the device for transporting optical network signals as illustrated in FIG. 3, wherein the upstream procedure and the downstream procedure may be accomplished through a device for transporting upstream optical network signals and a device for transporting downstream optical network signals respectively, or through a device for transporting optical network signals, which integrates the upstream and downstream operations.

Figure 5:
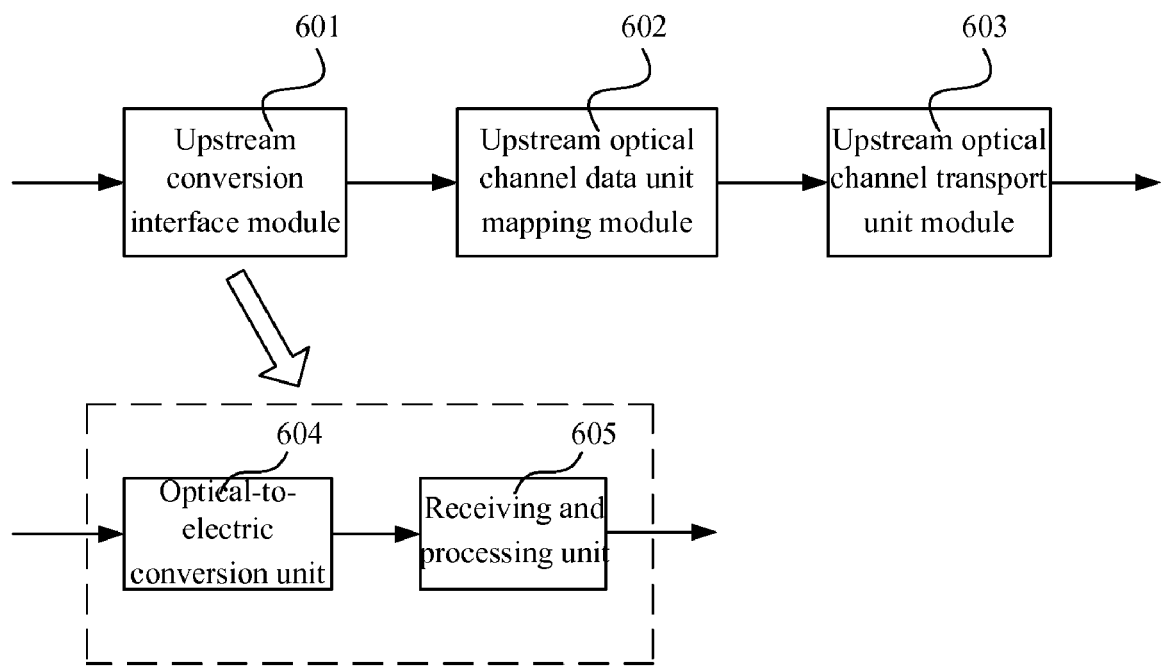
FIG. 5 is a structural schematic diagram of a first embodiment of a device for transporting optical network signals according to the present invention.

FIG. 5 shows a structural schematic diagram of a first embodiment of the device for transporting optical network signals of the invention. The device for transporting optical network signals in this embodiment includes an upstream conversion interface module 601, an upstream optical channel data unit mapping module 602, and an upstream optical channel transport unit module 603. Particularly, the upstream conversion interface module 601 is adapted to convert upstream optical signals from the ONU 1 into upstream data streams. As can be appreciated by those skilled in the art, since the ONU 1 is a part of the PON, the upstream optical signals from the ONU 1 are upstream optical signals in a PON frame format. The upstream optical channel data unit mapping module 602, connected with the upstream conversion interface module 601, is adapted to map the upstream data streams to upstream optical channel data unit signals (ODUK). The upstream optical channel transport unit module 603, connected with the upstream optical channel data unit mapping module 602, is adapted to convert the upstream optical channel data unit signals (ODUK) into upstream signals with an optical channel transport unit format (OTUK), and to transport them in the optical transport network. As can be seen from the processing performed by the device for transporting optical network signals on the upstream optical signals from the ONU1, due to the use of the technical solution in which the upstream optical signals are mapped as client signals to the upstream optical channel data unit signals (ODUK), the original PON frame format can be kept during the subsequent OTN transport, thus enabling the transparent passing of the PON through the OTN.

The upstream conversion interface module 601 can particularly include: an optical-to-electric conversion unit 604, and a receiving and processing unit 605. The optical-to-electric conversion unit 604 can convert the received upstream optical signals from the ONU 1 into upstream electric signals. The receiving and processing unit 605 can adjust the upstream electric signals with a random phase into signals with a uniform bit or byte clock, and transport them to the upstream optical channel data unit mapping module 602. Optionally, the upstream conversion interface module 601 may further include a rate detecting unit. Rates of the upstream optical signals from the ONU 1 may vary differently, such as 2.5G, 1.25G, 622M, thus in order for good rate matching, the rate detecting unit can first detect a rate of the upstream optical signals from the ONU 1 prior to the optical-to-electric conversion by the optical-to-electric converting unit 604.

Two specific implementing methods will be given below for the receiving and processing unit 605. One is a multi-phase receiving and processing unit, which can adjust in a serial manner the upstream electric signals with a random phase into upstream electric signals with a uniform bit or byte clock, then convert the signals into parallel upstream data streams, and next transport them to the upstream optical channel data unit mapping module 602. The other is an upstream burst receiving and processing unit, which can re-delimit burst packets of the upstream electric signals to be adjusted into those with a uniform byte clock, then recover preamble byte signals of the burst packets to form upstream data streams, and transport them to the upstream optical channel data unit mapping module 602.

During the receiving of data, a multitude-judgment criterion is adopted to receive data, for instance, a 2-of-3 judgment criterion is adopted for a bit "1", i.e. received data can be determined as "1" if it has been determined as "1" twice.

Figure 6:
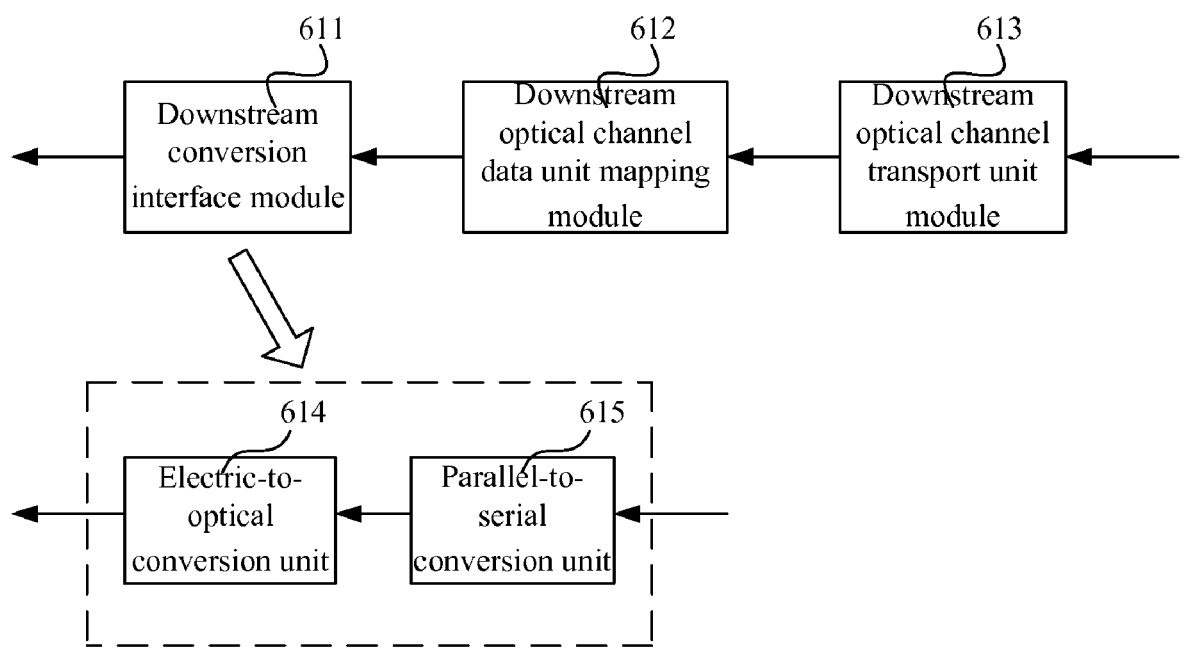
FIG. 6 is a structural schematic diagram of a second embodiment of the device for transporting optical network signals according to the present invention.

The first embodiment as illustrated in FIG. 5 provides a device for transporting optical network signals that implements only the upstream procedure, and a device for transporting optical network signals that implements only a downstream procedure is illustrated in FIG. 6, including a downstream conversion interface module 611, a downstream optical channel data unit mapping module 612, and a downstream optical channel transport unit module 613. Particularly, the downstream optical channel transport unit module 613 de-maps downstream signals with an optical channel transport unit format (OTUK) from the optical transport network to downstream optical channel data unit signals (ODUK), and the downstream optical channel data unit mapping module 612 de-maps the downstream optical channel data unit signals (ODUK) to obtain downstream frame data streams. Then the downstream conversion interface module 611 converts the received downstream frame data streams into the downstream optical signals. The device for transporting optical line signals 7 also maps the downstream signals with a PON frame format as client signals to the downstream optical channel data unit signals, thus the downstream frame data streams obtained from the de-mapping by the downstream optical channel data unit mapping module 612 in the device for transporting optical network signals are also in the PON frame format. Furthermore, the downstream optical signals obtained from the conversion by the downstream conversion interface module 611 are also in the PON frame format.

The downstream conversion interface module 611 particularly includes an electric-to-optical conversion unit 614 and a parallel-to-serial conversion unit 615. The parallel-to-serial conversion unit 615 parallel-to-serial converts the downstream frame data streams received from the downstream optical channel data unit mapping module 612 into the downstream electric signals, and the electric-to-optical conversion unit 614 converts the downstream electric signals into the downstream optical signals.

Figure 7:
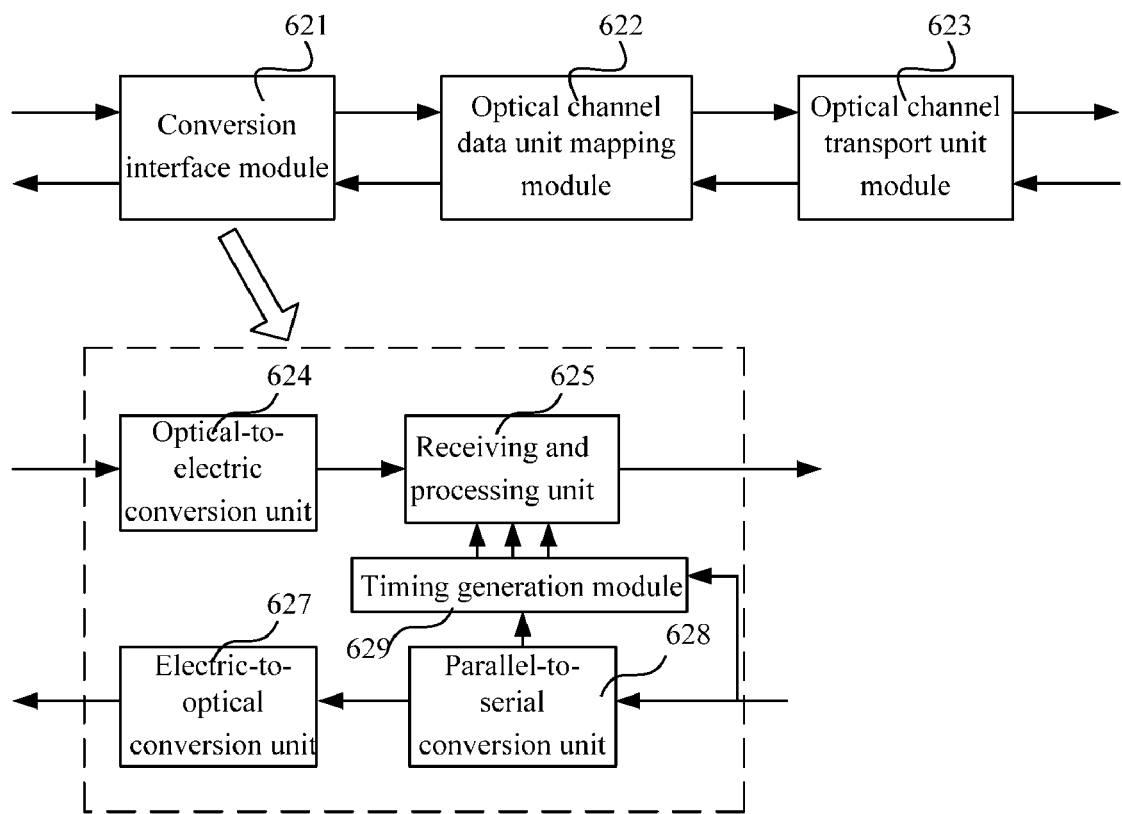
FIG. 7 is a structural schematic diagram of a third embodiment of the device for transporting optical network signals according to the present invention.

FIG. 7 shows a structural schematic diagram of a third embodiment of the device for transporting optical network signals of the invention. This embodiment in a device mode integrates the upstream and downstream procedures. The device for transporting optical network signals includes a conversion interface module 621, an optical channel data unit mapping module 622, and an optical channel transport unit module 623. All the modules included in the embodiment are provided with respective upstream functions as in the first embodiment, and respective downstream functions as in the second embodiment. Particularly, the conversion interface module 621 includes: an optical-to-electric conversion unit 624, and a receiving and processing unit 625, which perform the upstream procedure, and an electric-to-optical conversion unit 627 and a parallel-to-serial conversion unit 628, which perform the downstream procedure. Furthermore, if the receiving and processing unit 625 is particularly a multi-phase receiving and processing unit, for the purpose of enabling the multi-phase receiving and processing unit to adjust the upstream optical burst packets with a random phase into signals with a uniform bit clock, the device for transporting optical network signals in this embodiment further includes a timing generation module 629 adapted to provide the multi-phase receiving and processing unit with a clock signal.

The present invention further discloses several specific implementing methods for the embodiment of the device for transporting optical line signals as illustrated in FIG. 3, in which the upstream procedure and the downstream procedure can be accomplished respectively through a device for transporting upstream optical line signals and a device for transporting downstream optical line signals, or through a device for transporting optical line signals, which integrates the upstream and downstream operations.

Figure 8:
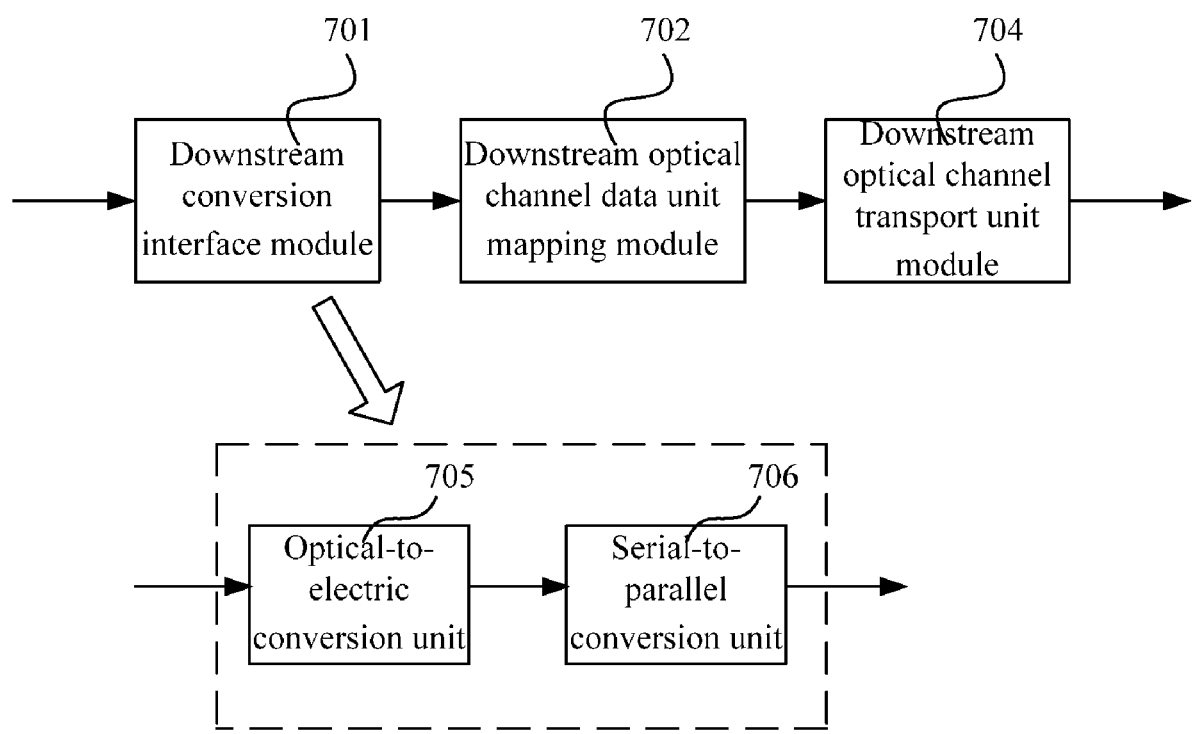
FIG. 8 is a structural schematic diagram of a first embodiment of a device for transporting optical line signals according to the present invention.

FIG. 8 shows a structural schematic diagram of a first embodiment of the device for transporting optical line signals of the invention. The device in this embodiment involves only the downstream procedure. The device for transporting optical line signals in this embodiment includes a downstream conversion interface module 701, a downstream optical channel data unit mapping module 702, and a downstream optical channel transport unit module 704. In this embodiment, downstream optical signals received by the downstream conversion interface module 701 are from the OLT 2, and therefore, the downstream optical signals are in a PON frame format (e.g. signals in a GTC frame format). Firstly, the downstream conversion interface module 701 converts the received downstream optical signals into downstream frame data streams, and then the downstream optical channel data mapping module 702 maps the downstream frame data streams downstream optical channel data unit signals (ODUK). The downstream optical channel transport unit module 704 converts the downstream optical channel data unit signals (ODUK) into downstream signals in an optical channel transport unit format (OTUK), and transports them in the optical transport network.

The downstream conversion interface module 701 particularly includes an optical-to-electric conversion unit 705 and a serial-to-parallel conversion unit 706. The optical-to-electric conversion unit 705 converts the downstream optical signals from the OLT 2 into downstream electric signals, and the serial-to-parallel conversion unit 706 converts the downstream electric signals into the downstream frame data streams, and transports them to the downstream optical channel data unit mapping module 702.

As can be seen, in the embodiment the downstream optical signals received by the device for transporting optical line signals are in the PON frame format. Therefore, the downstream optical signals after being mapped as client signals to the optical channel data unit signals keep the original PON frame format. The signals in the PON frame format thus pass through the optical transport network transparently.

Figure 9:
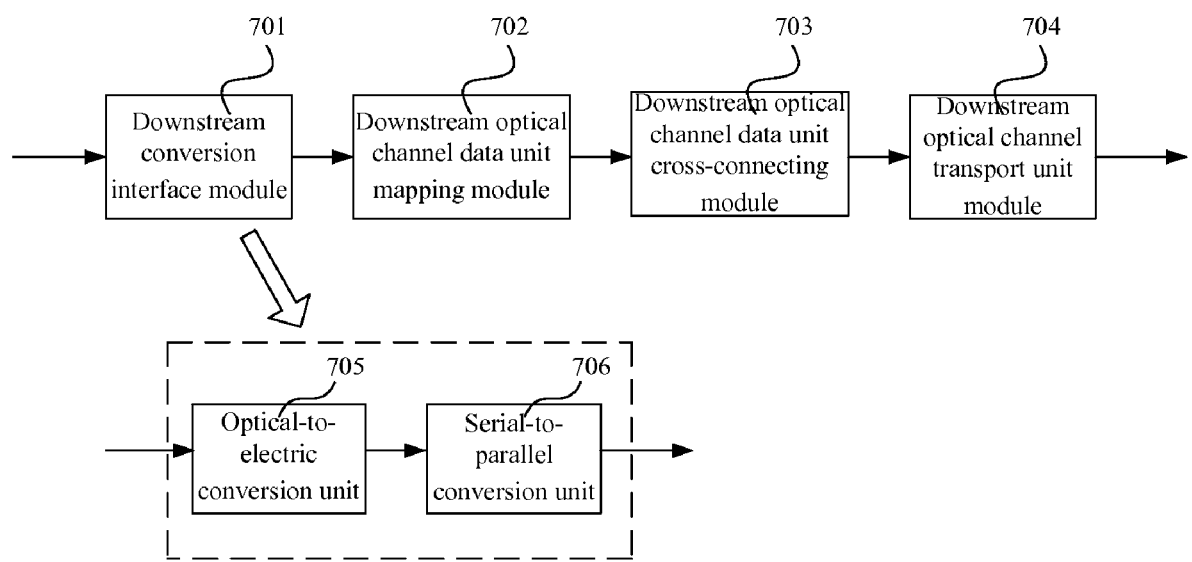
FIG. 9 is a structural schematic diagram of a second embodiment of the device for transporting optical line signals according to the present invention.

FIG. 9 is a structural schematic diagram of a second embodiment of the device for transporting optical line signals in the invention. The first embodiment as illustrated in FIG. 8 is applicable to a single set of downstream optical channel data unit signals (ODUK). If there are multiple sets of downstream optical channel data unit signals (ODUK), a downstream optical channel data unit cross-connecting module 703 is added, which performs cross-scheduling on the multiple sets of downstream optical channel data unit signals (ODUK) obtained from the mapping by the downstream optical channel data mapping module 702. Then the downstream optical channel transport unit module 704 converts the cross-scheduled downstream optical channel data unit signals (ODUK) into downstream signals with an optical channel transport unit format (OTUK), and transports them in the optical transport network.

Figure 10:
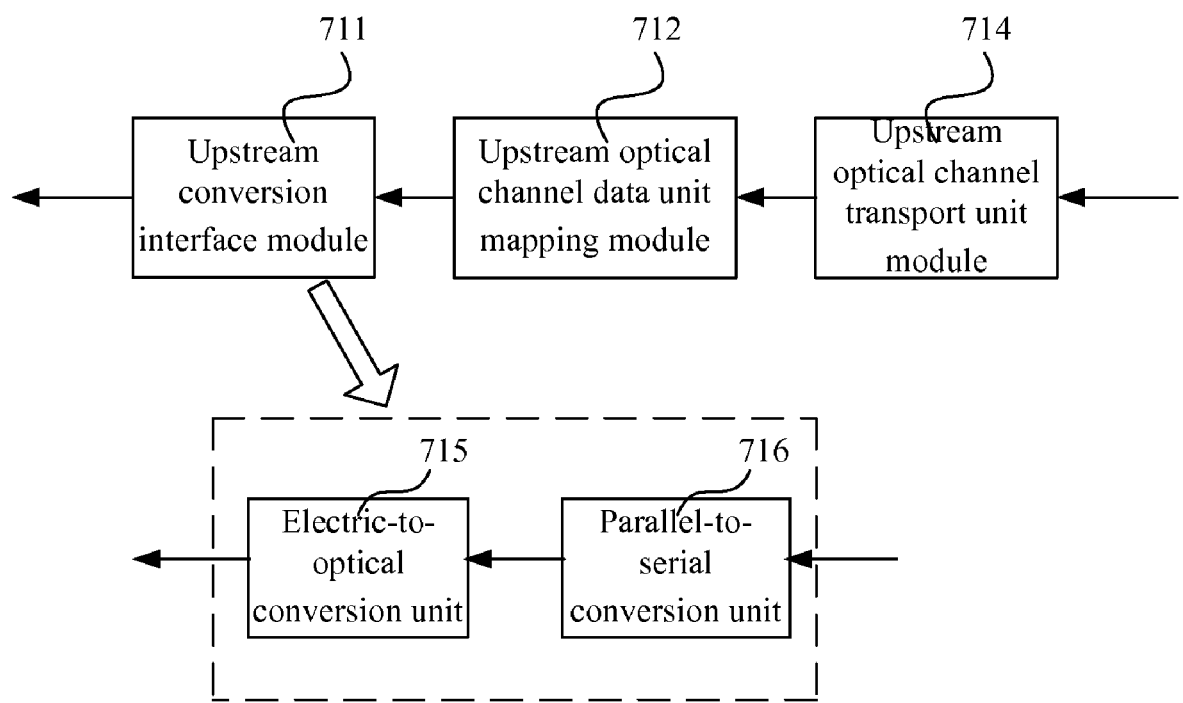
FIG. 10 is a structural schematic diagram of a third embodiment of the device for transporting optical line signals according to the present invention.

FIG. 10 shows a structural schematic diagram of a third embodiment of the device for transporting optical line signals of the invention. This embodiment is a device dedicated to the upstream procedure. The device for transporting optical line signals in this embodiment includes an upstream conversion interface module 711, an upstream optical channel data unit mapping module 712, and an upstream optical channel transport unit module 714. The upstream optical channel transport unit module 714 converts upstream signals in an optical channel transport unit format (OTUK) from the optical transport network into upstream optical channel data unit signals (ODUK). Then the upstream optical channel data unit mapping module 712 de-maps the upstream optical channel data unit signals (ODUK) to upstream data streams. Finally the upstream conversion interface module 711 converts the received upstream data streams into the upstream optical signals.

The upstream conversion interface module 711 particularly includes an electric-to-optical conversion unit 715 and a parallel-to-serial conversion unit 716. The parallel-to-serial conversion unit 716 parallel-to-serial converts the received upstream data streams into upstream electric signals, and the electric-to-optical conversion unit 715 converts the electric signals into the upstream optical signals.

As can be appreciated, the upstream signals with the optical channel transport unit format (OTUK), received by the device for transporting optical line signals 7, are from the device for transporting optical network signals 6, and it can be known from the above description of the device for transporting optical network signals 6 that the client signals encapsulated in the upstream signals transported by the device for transporting optical network signals 6 to the device for transporting optical line signals through the OTN are in the PON frame format. Therefore, the upstream data streams obtained from the de-mapping of the received upstream signals by the device for transporting optical line signals 7 are also in the PON frame format, and furthermore, the upstream optical signals obtained from the conversion are also accordingly in the PON frame format.

Figure 11:
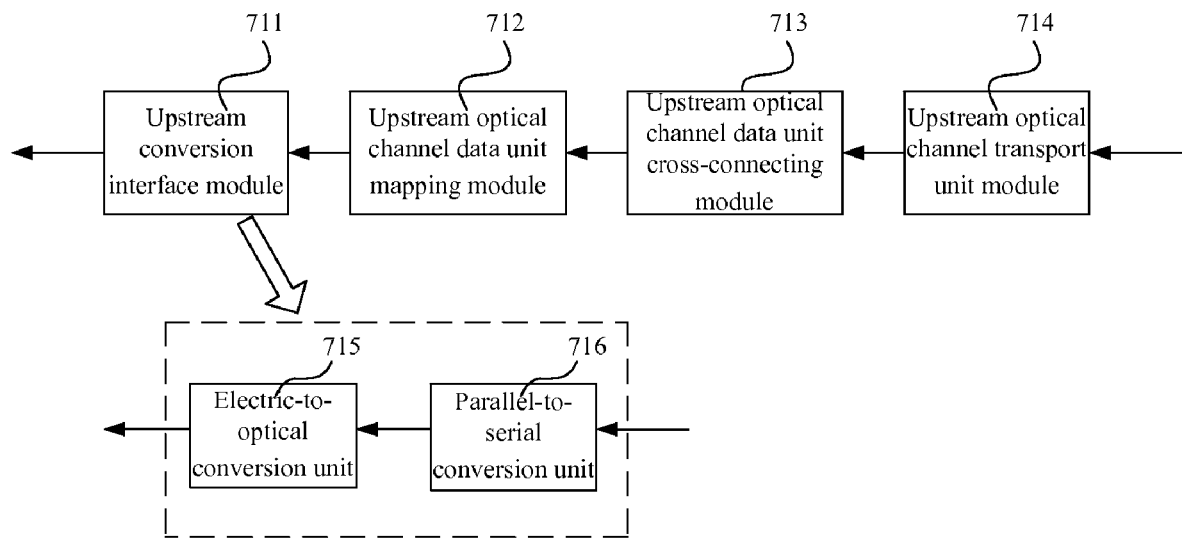
FIG. 11 is a structural schematic diagram of a fourth embodiment of the device for transporting optical line signals according to the present invention.

FIG. 11 is a structural schematic diagram of a fourth embodiment of the device for transporting optical line signals of the invention. The third embodiment is applicable to a single set of upstream optical channel data unit signals (ODUK). If there are multiple sets of upstream optical channel data unit signals (ODUK), an upstream optical channel data unit cross-connecting module 713 is added, which performs cross-scheduling on the multiple sets of upstream optical channel data unit signals (ODUK). Then the upstream optical channel data unit mapping module 712 de-maps the upstream optical channel data unit signals (ODUK) to upstream data streams, and finally the upstream conversion interface module 711 converts the received upstream data streams into the upstream optical signals.

Figure 12:
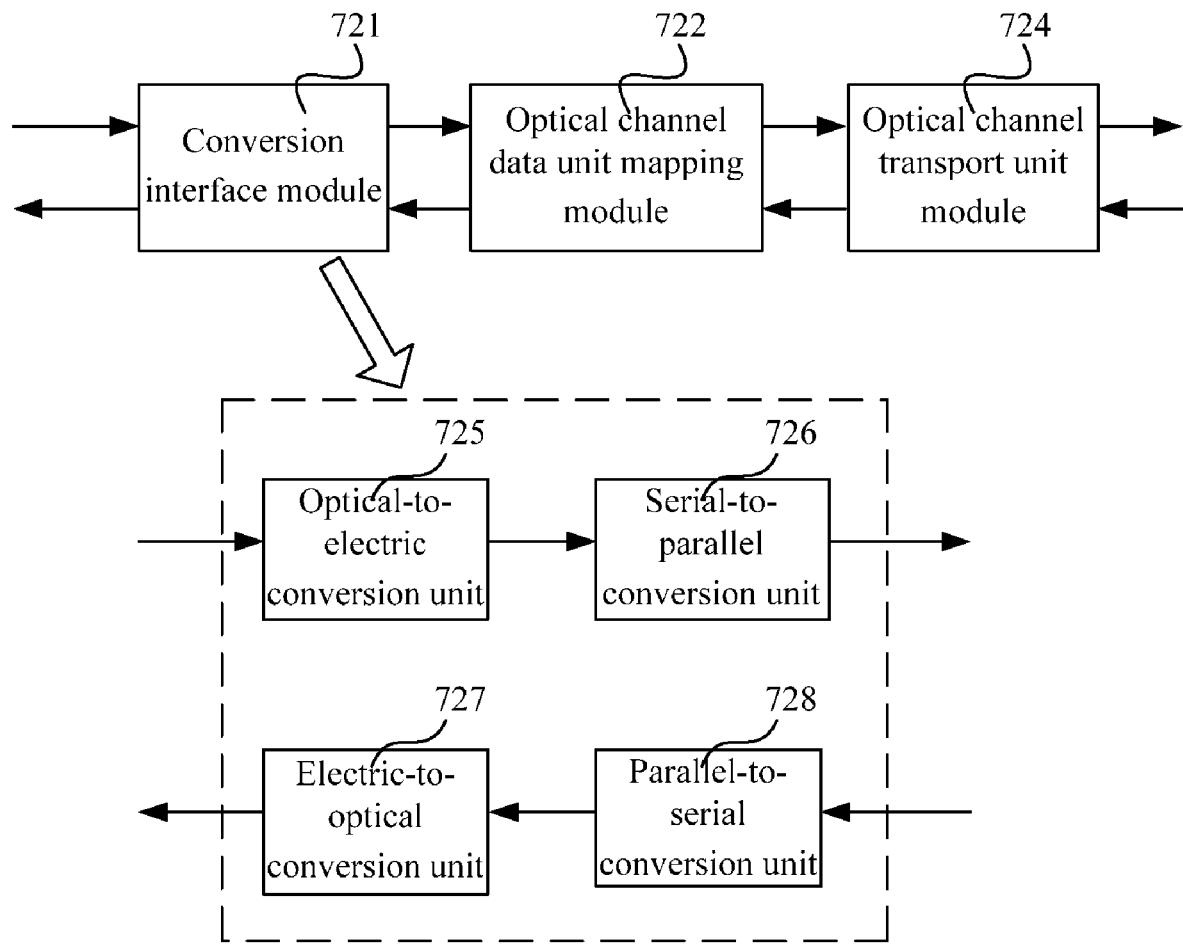
FIG. 12 is a structural schematic diagram of a fifth embodiment of the device for transporting optical line signals according to the present invention.

FIG. 12 shows a structural schematic diagram of a fifth embodiment of the device for transporting optical line signals of the invention. This embodiment in a device mode integrates the upstream and downstream procedures. The device for transporting optical line signals in this embodiment includes a conversion interface module 721, an optical channel data unit mapping module 722, and an optical channel transport unit module 724. All the modules included in the embodiment are provided with respective downstream functions as in the first embodiment of the device for transporting optical line signals, and respective upstream functions as in the third embodiment of the device for transporting optical line signals. Particularly, the conversion interface module 721 includes an optical-to-electric conversion unit 725 and a serial-to-parallel conversion unit 726, which perform the upstream procedure, and an electric-to-optical conversion unit 727 and a parallel-to-serial conversion unit 728, which perform the downstream procedure.

Figure 13:
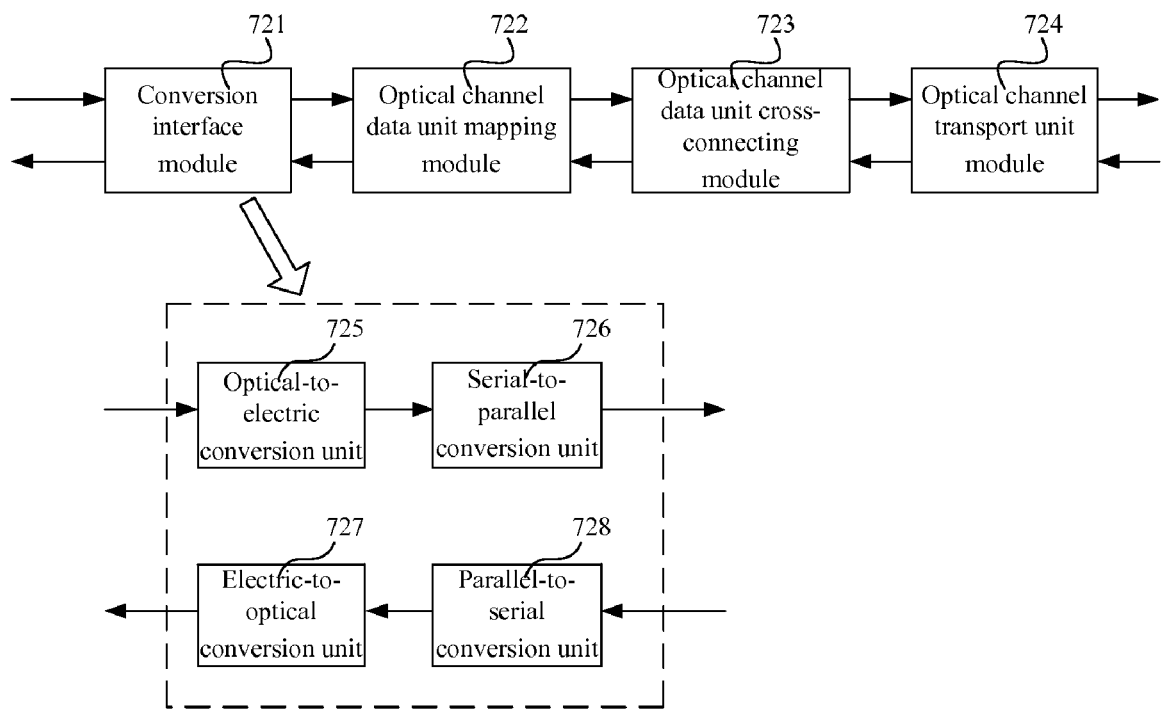
FIG. 13 is a structural schematic diagram of a sixth embodiment of the device for transporting optical line signals according to the present invention.

FIG. 13 illustrates a structural schematic diagram of a sixth embodiment of the device for transporting optical line signals of the invention. The embodiment as illustrated in FIG. 12 is applicable to a single set of upstream or downstream optical channel data unit signals (ODUK). If there are multiple sets of upstream or downstream optical channel data unit signals (ODUK), an optical channel data unit cross-connecting module 723 is added so as to perform cross-scheduling on the upstream or downstream optical channel data unit signals (ODUK).

Figure 14:
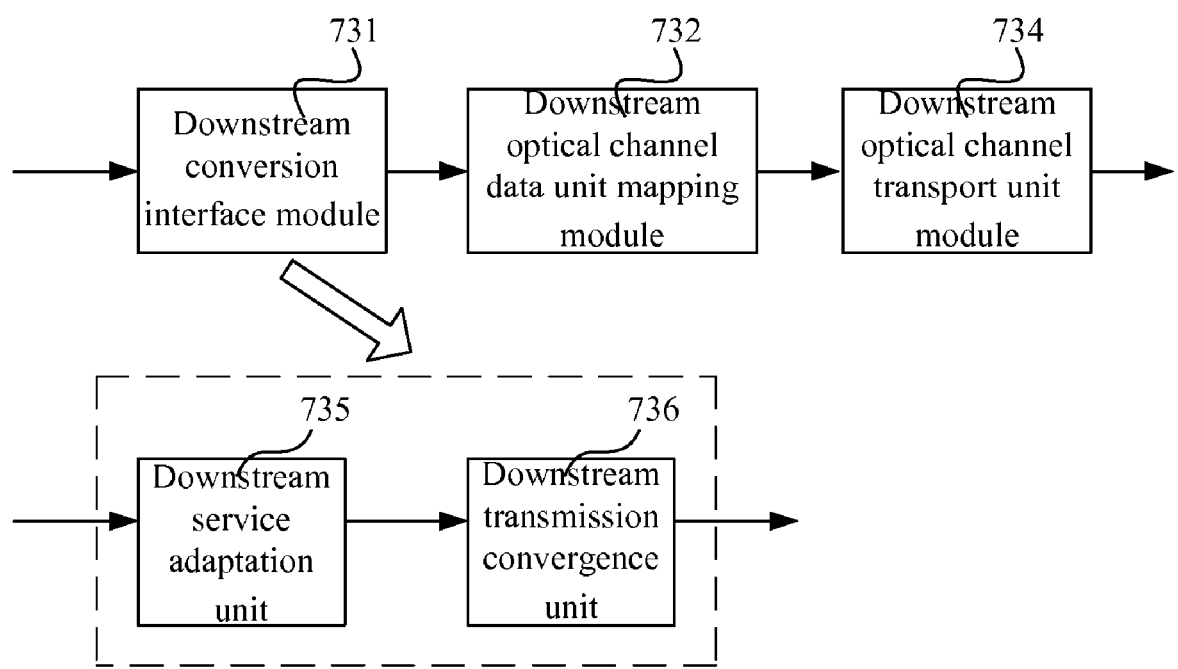
FIG. 14 is a structural schematic diagram of a seventh embodiment of the device for transporting optical line signals according to the present invention.

In the embodiment of the system as illustrated in FIG. 3, the OLT 2 may be configured separately, or be built in the device for transporting optical line signals 7. FIG. 14 shows a structural schematic diagram of a seventh embodiment of the device for transporting optical line signals of the invention. In this embodiment, a function of an OLT is integrated in the device for transporting optical line signals. The device for transporting optical line signals in this embodiment includes a downstream conversion interface module 731, a downstream optical channel data unit mapping module 732, and a downstream optical channel transport unit module 734. The downstream conversion interface module 731 first converts received downstream signals (i.e. downstream service signals from a network serving party) into downstream frame data streams. The downstream optical channel data unit mapping module 732 maps the downstream frame data streams to downstream optical channel data unit signals (ODUK). The downstream optical channel transport unit module 734 converts the downstream optical channel data unit signals (ODUK) into downstream signals with an optical channel transport unit format (OTUK), and transports them in the optical transport network.

In the downstream conversion interface module 731, an OLT is integrated, and particularly a downstream service adaptation unit 735 and a downstream transmission convergence unit 736 are included. The downstream service adaptation unit 735 is adapted to adapt the received downstream service signals into downstream PON internal frames, and the downstream transmission convergence unit 736 multiplexes, and assembles the downstream PON internal frames with a frame format of a downstream transmission convergence layer, in order to form downstream frame data streams in the frame format of the downstream transmission convergence layer.

Figure 15:
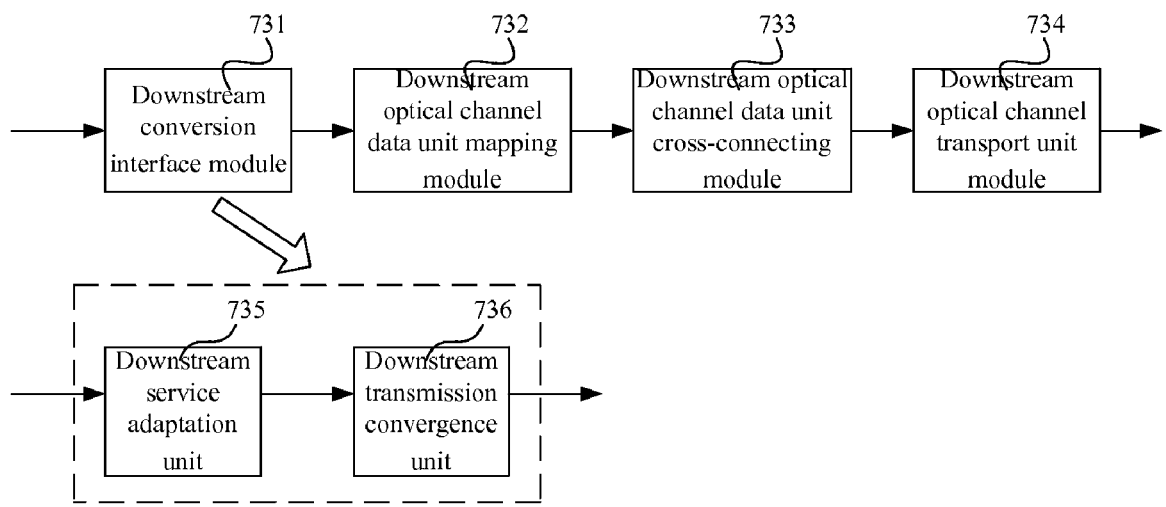
FIG. 15 is a structural schematic diagram of an eighth embodiment of the device for transporting optical line signals according to the present invention.

FIG. 15 is a structural schematic diagram of an eighth embodiment of the device for transporting optical line signals of the invention. The embodiment of the device for transporting optical line signals as illustrated in FIG. 14 is applicable to a single set of downstream optical channel data unit signals (ODUK). If there are multiple sets of downstream optical channel data unit signals (ODUK), a downstream optical channel data unit cross-connecting module 733 is added, which performs cross-scheduling on the downstream optical channel data unit signals (ODUK) obtained from the mapping by the downstream optical channel data mapping module 732. Then the downstream optical channel transport unit module 734 converts the cross-scheduled downstream optical channel data unit signals (ODUK) into downstream signals with an optical channel transport unit format (OTUK).

Figure 16:
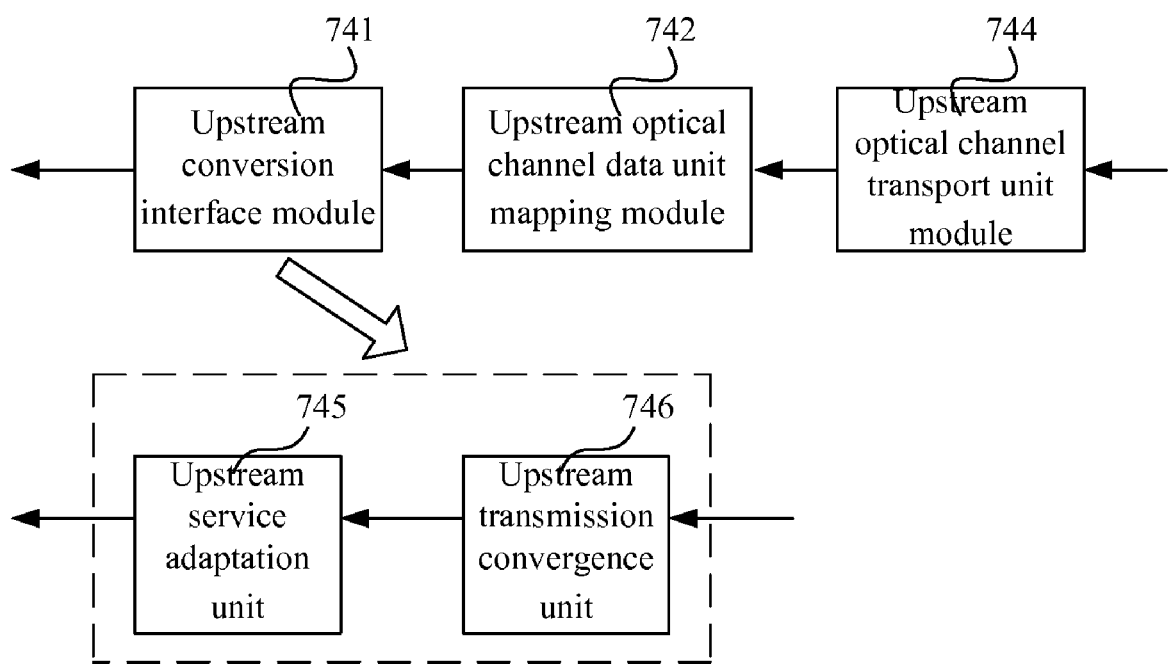
FIG. 16 is a structural schematic diagram of a ninth embodiment of the device for transporting optical line signals according to the present invention.

FIG. 16 shows a structural schematic diagram of a ninth embodiment of the device for transporting optical line signals of the invention. This embodiment is a device for transporting optical line signals with a built-in OLT, dedicated for the upstream procedure. The device for transporting optical line signals includes an upstream conversion interface module 741, an upstream optical channel data unit mapping module 742, and an upstream optical channel transport unit module 744. The upstream optical channel transport unit module 744 de-maps upstream signals in an optical channel transport unit format (OTUK) from the optical transport network to upstream optical channel data unit signals (ODUK). The upstream optical channel data unit mapping module 742 de-maps the upstream optical channel data unit signals (ODUK) to upstream data streams. Finally the upstream conversion interface module 741 converts the received upstream data streams into original service signals.

The upstream conversion interface module 741 particularly includes an upstream service adaptation unit 745 and an upstream transmission convergence unit 746. Particularly, the upstream transmission convergence unit 746 is adapted to de-map the upstream data streams in an upstream transmission convergence layer format to upstream PON internal frames (e.g. a GEM frame). The upstream service adaptation unit 745, connected with the upstream transmission convergence unit 746, is adapted to de-map the upstream PON internal frames to the original service signals (e.g. signals in an MAC frame format).

Figure 17:
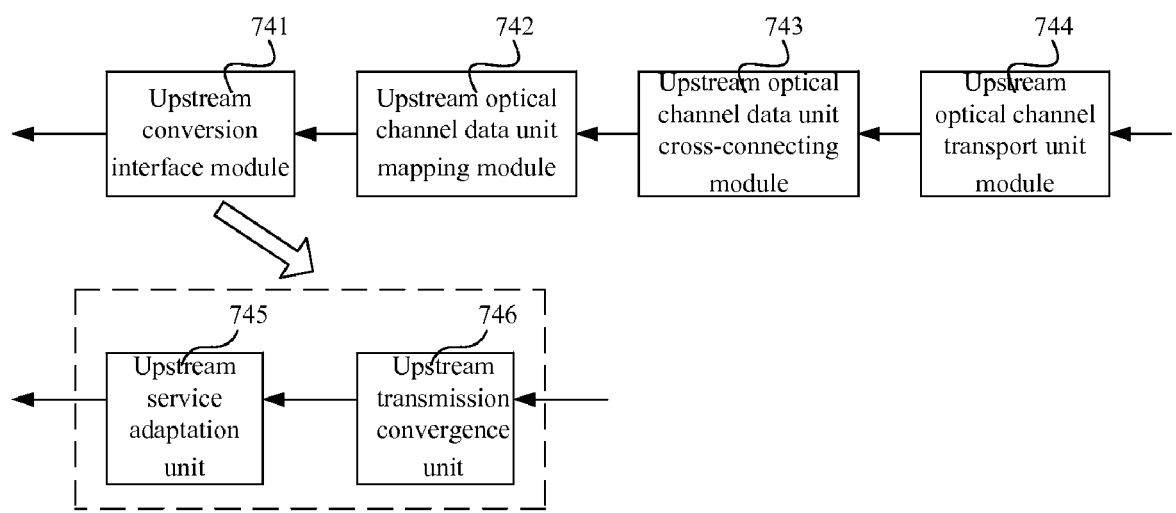
FIG. 17 is a structural schematic diagram of a tenth embodiment of the device for transporting optical line signals according to the present invention.

FIG. 17 is a structural schematic diagram of a tenth embodiment of the device for transporting optical line signals of the invention. The embodiment of the device for transporting optical line signals as illustrated in FIG. 16 is applicable to a single set of upstream optical channel data unit signals. If there are multiple sets of upstream optical channel data unit signals, an upstream optical channel data unit cross-connecting module 743 shall be added, which performs cross-scheduling on the upstream optical channel data unit signals. Then the upstream optical channel data unit mapping module 742 de-maps the upstream optical channel data unit signals (ODUK) to the upstream data streams.

Figure 18:
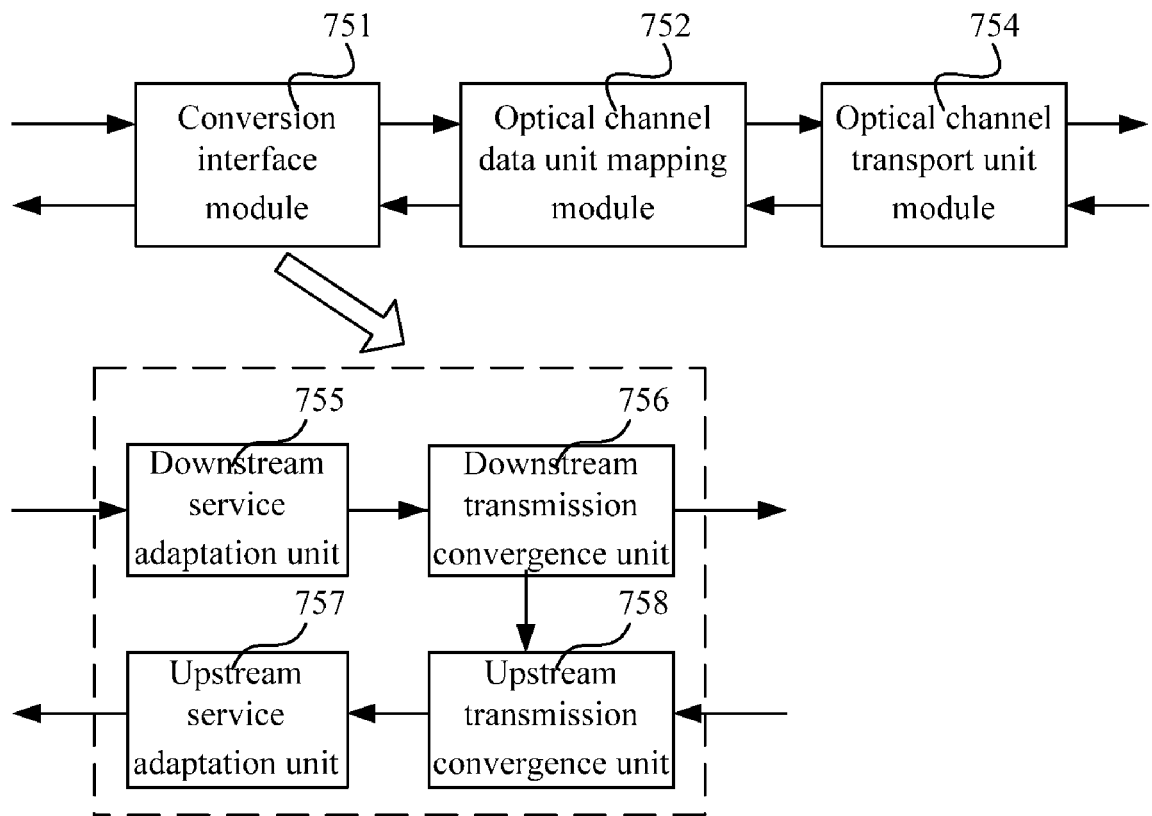
FIG. 18 is a structural schematic diagram of an eleventh embodiment of the device for transporting optical line signals according to the present invention.

FIG. 18 shows a structural schematic diagram of an eleventh embodiment of the device for transporting optical line signals of the invention. This embodiment is a device mode integrating the upstream and downstream procedures. The device for transporting optical line signals in this embodiment includes a conversion interface module 751, an optical channel data unit mapping module 752, and an optical channel transport unit module 754. All the modules included in the embodiment are provided with respective downstream functions as in the seventh embodiment illustrated in FIG. 14, and respective upstream functions as in the ninth embodiment illustrated in FIG. 16. Particularly, the conversion interface module 751 includes a downstream service adaptation unit 755 and a downstream transmission convergence unit 756, which perform the downstream procedure, and an upstream service adaptation unit 757 and an upstream transmission convergence unit 758, which perform the upstream procedure.

Figure 19:
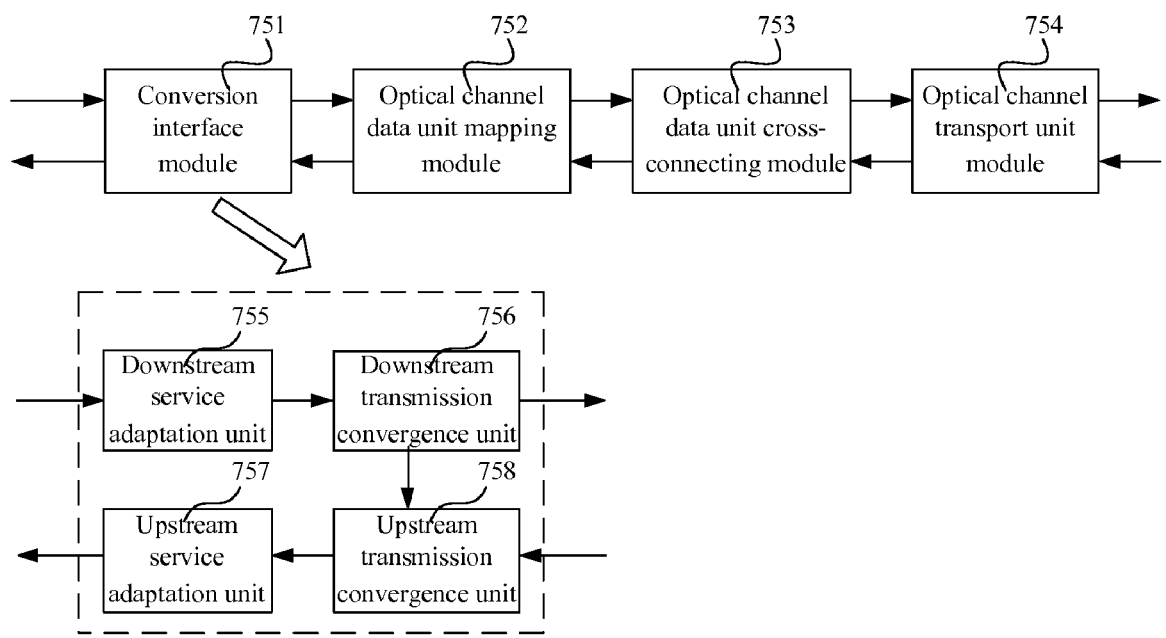
FIG. 19 is a structural schematic diagram of a twelfth embodiment of the device for transporting optical line signals according to the present invention.

FIG. 19 illustrates a structural schematic diagram of a twelfth embodiment of the device for transporting optical line signals of the invention. The embodiment as illustrated in FIG. 18 is applicable to a single set of upstream or downstream optical channel data unit signals. If there are multiple sets of upstream or downstream optical channel data unit signals, an optical channel data unit cross-connecting module 753 is added so as to perform cross-scheduling on the upstream or downstream optical channel data unit signals.

On the basis of the above respective embodiments of the system and device for transporting signals through a passive optical network, the present invention provides embodiments of upstream and downstream flows. The upstream transport procedure basically includes: mapping upstream optical signals (in a PON frame format) transported from the ONU 1 to upstream optical channel data unit signals (ODUK) (i.e. upstream optical signals are mapped as client signals into the ODUK), converting the upstream optical channel data unit signals into and transporting upstream signals with an optical channel transport unit format (OTUK) through the optical transport network; converting the upstream signals with the optical channel transport unit format (OTUK) received from the optical transport network into the upstream optical channel data unit signals (ODUK), de-mapping to obtain the upstream signals with the PON frame format (e.g. the signals in a GTC frame format), transporting the upstream signals with the PON frame format to the OLT; and finally performing recovery on the upstream signals by the OLT, and providing recovered signals to the network serving party.

Prior to transporting the upstream optical signals by the ONU 1, the upstream service signals received from the user-side device are mapped to PON internal frames, which are then adapted to a payload area of the upstream optical signals, and are transported in an upstream timeslot location assigned for the upstream optical signals. As can be seen from this, the signals transported from the ONU 1 are in the PON frame format.

Figure 20:
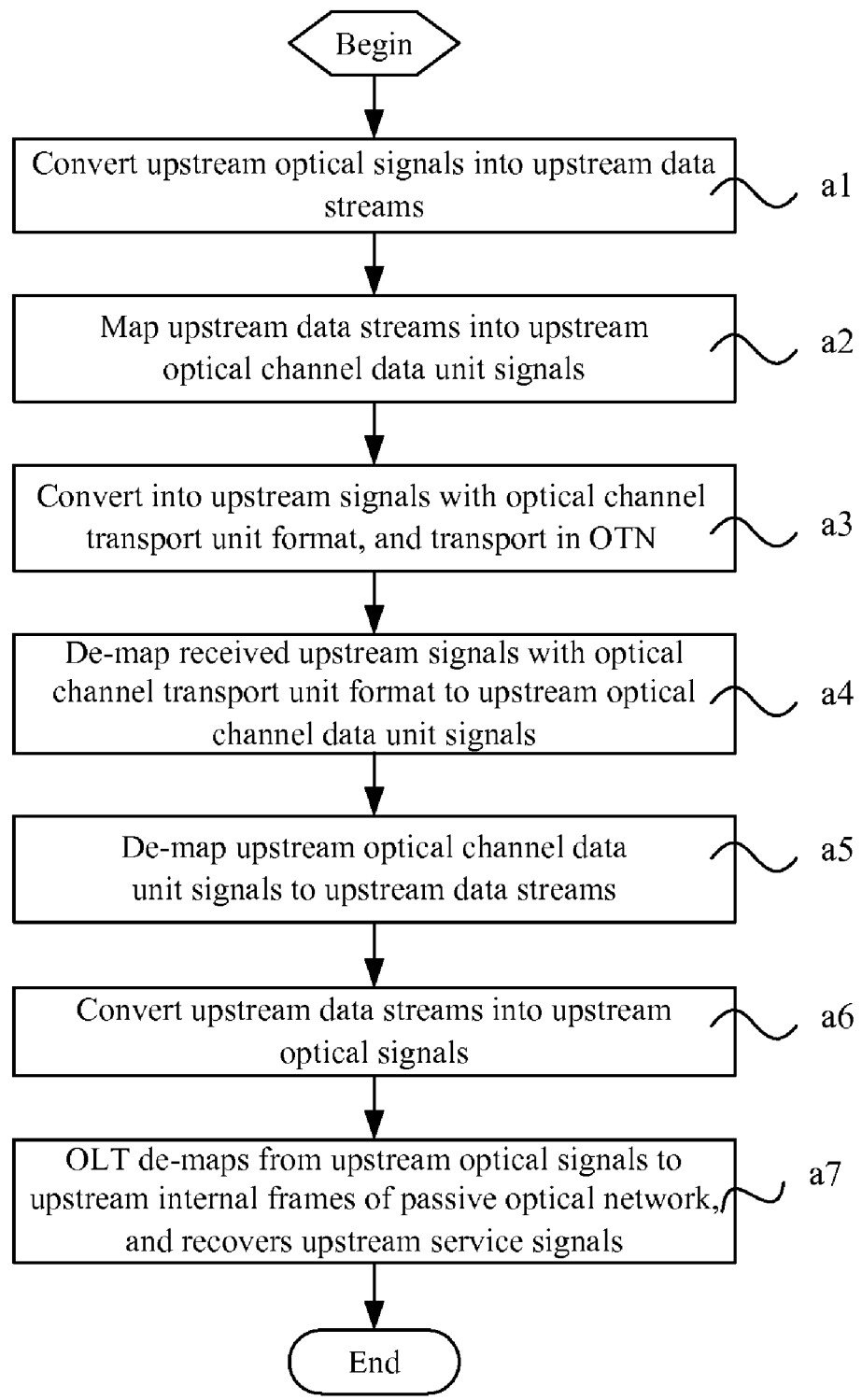
FIG. 20 is a schematic diagram of a specific procedure for a method for transporting signals upstream through a passive optical network according to the present invention.

FIG. 20 shows a schematic diagram of a specific procedure for an embodiment of the method for transporting signals upstream through a passive optical network of the invention, including:

Step a1: Converting upstream optical signals transported from ONUs into upstream data streams. Specifically, firstly the upstream optical signals transported from the ONUs are converted into upstream electric signals, and then the upstream electric signals are phase adjusted into upstream electric signals with a uniform bit or byte clock, which are then converted into the upstream data streams. There are two alternatives for the phase adjusting: the upstream electric signals with a random phase may be adjusted in a serial way into upstream electric signals with a uniform bit or byte clock, which are then converted into parallel upstream data streams; or burst packets of the upstream optical signals are re-delimited to be adjusted into upstream optical signals with a uniform bit or byte clock, and the upstream data streams are recovered from preamble byte signals of the burst packets. The phase adjusting may be performed dependent on a clock downstream.

Step a2: Mapping the upstream data streams to upstream optical channel data unit signals (ODUK).

Step a3: Converting the upstream optical channel data unit signals (ODUK) into upstream signals with the optical channel transport unit format (OTUK), transporting them in the OTN.

Step a4: De-mapping the upstream signals with the optical channel transport unit format (OTUK) from the OTN to upstream optical channel data unit signals (ODUK).

Step a5: De-mapping the upstream optical channel data unit signals (ODUK) to upstream data streams.

Step a6: Converting the upstream data streams into upstream optical signals. Specifically, firstly the upstream data streams are parallel-to-serial converted into upstream electric signals, and then the upstream electric signals are converted into the upstream optical signals.

Step a7: De-mapping by the OLT the upstream optical signals to upstream PON internal frames, and recovering the upstream service signals (e.g. signals in a MAC frame format) from the PON internal frames.

If there are multiple sets of upstream optical channel data unit signals (ODUK) received in the OTN, then in the steps a4 and a5 there is a further step of cross-scheduling the upstream optical channel data unit signals (ODUK).

In the upstream procedure, in addition to the clock phase adjusting, the device for transporting optical network signals may also divide upstream channel timeslots of the ODUK dependent upon an upstream rate: if the upstream rate is a rate of STM-16, the upstream data streams are mapped into a level-1 optical channel payload unit; if the upstream rate is a half of the rate of STM-16, the level-1 optical channel payload unit is divided into two upstream channel timeslots, and the upstream data streams are mapped to either of the two upstream channel timeslots.

The downstream transport procedure basically includes: firstly mapping downstream optical signals transported from an OLT to downstream optical channel data unit signals, converting the downstream optical channel data unit signals into and transporting downstream signals with the optical channel transport unit format through the OTN; then converting the downstream signals with the optical channel transport unit format received from the OTN into downstream optical channel data unit signals, de-mapping the downstream optical channel data unit signals to downstream optical signals with the PON frame format, transporting the downstream optical signals with the PON frame format to an ONU; and finally performing recovery on the downstream optical signals by the ONU, and further transporting recovered signals to the user-side device.

Figure 21:
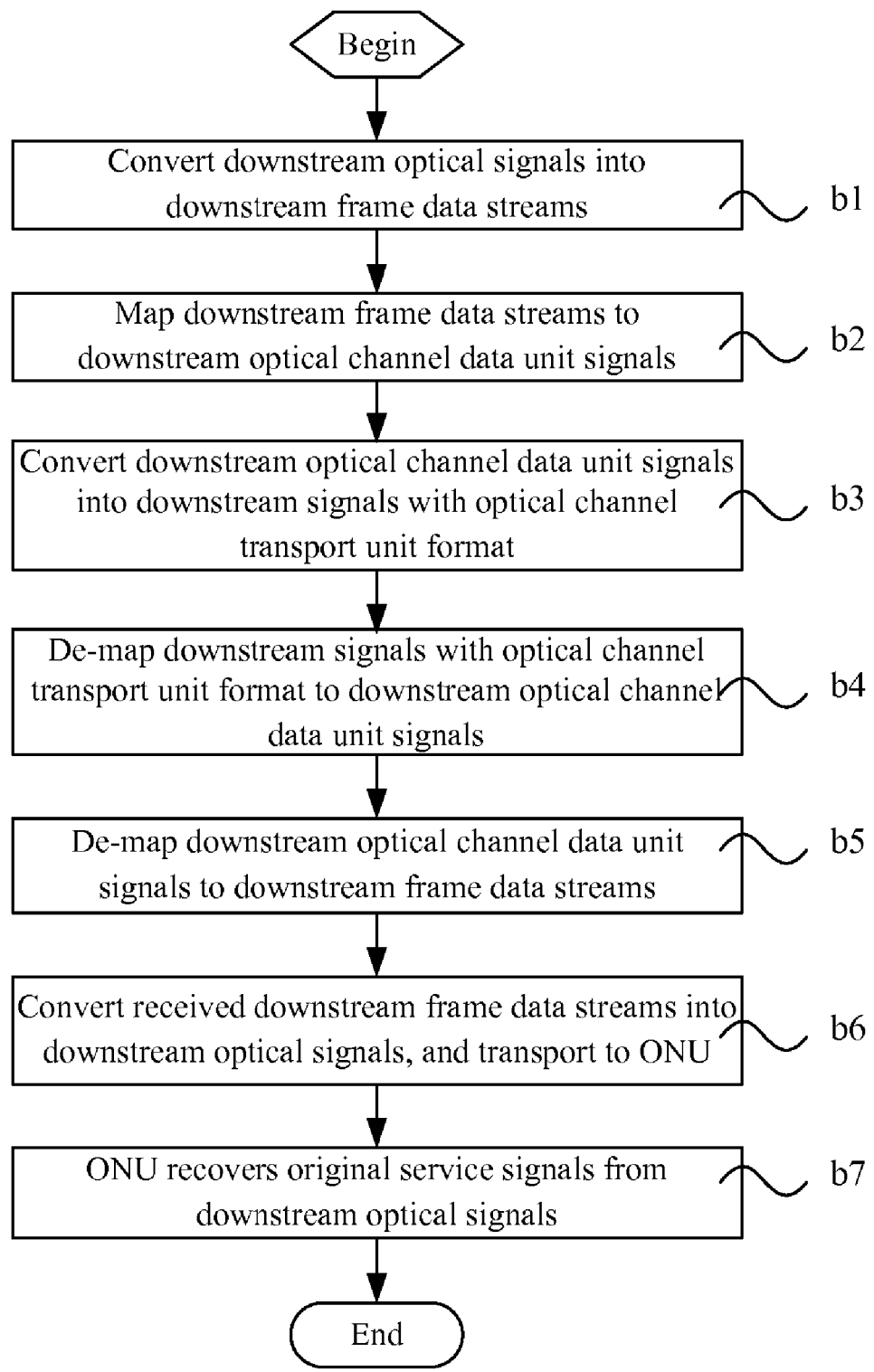
FIG. 21 is a schematic diagram of a specific procedure for a method for transporting signals downstream through a passive optical network according to the present invention.

FIG. 21 shows a schematic diagram of a specific procedure for the method for transporting signals downstream through a passive optical network, including:

Step b1: converting downstream optical signals transported from an OLT into downstream frame data streams. Specifically, firstly the downstream optical signals from an OLT are converted into downstream electric signals, then the downstream electric signals are serial-to-parallel converted into the downstream frame data streams, and the downstream frame data streams are transported to the downstream optical channel data unit mapping module.

Step b2: mapping the downstream frame data streams to downstream optical channel data unit signals (ODUK).

Steps b3: converting the downstream optical channel data unit signals into downstream signals with the optical channel transport unit format (OTUK), transporting the downstream signals with the optical channel transport unit format in the OTN.

Step b4: converting the downstream signals with the optical channel transport unit format (OTUK) from the OTN into downstream optical channel data unit signals (ODUK).

Step b5: de-mapping the downstream optical channel data unit signals (ODUK) to downstream frame data streams (with the PON frame format).

Step b6: converting the received downstream frame data streams into downstream optical signals, and transporting the downstream optical signals to an ONU. Specifically, the received downstream frame data streams are firstly serial-to-parallel converted into downstream electric signals, the downstream electric signals are converted into the downstream optical signals, and the downstream optical signals are then transported to the ONU.

Step b7: recovering original service signals from the optical signals by the ONU, and transporting the original service signals to the user-side device.

If there are multiple sets of downstream optical channel data unit signals (ODUK) received in the OTN, then in the steps b4 and b5 there is a further step of cross-scheduling the downstream optical channel data unit signals (ODUK).

With respect to the upstream and downstream transport methods described as above, if the OLT is built in the device for transporting optical line signals, the procedures are simplified accordingly, which makes the maintenance and management more convenient. Furthermore, there can be multiple available options for clock configuration. For example, a clock used in the upstream transmission convergence unit 758 may be a clock transported from the upstream optical channel data mapping module 752, or a clock transported from the downstream transmission convergence unit 756, or a clock obtained from recovering a clock of an independent data table.

In processing serial data, each optical burst packet will be frame delimited, i.e. a delimiter will be searched for in the optical burst packet so as to obtain a data location, or a parallel frame delimiting processing may be performed through a pipeline frame alignment circuit.

In the various embodiments of the invention, the same functional modules have been renumbered with the reference numbers dependent upon the respective embodiments, and shall not be considered as different functional modules.

As can be seen from the technical solutions according the embodiments of the present invention, the upstream or downstream signals of the PON (i.e. signals in the PON frame format) are transported to the OLT of a central office through a channel layer of the transport network OTN. In other words, the data stream signals of the transmission convergence layer in the PON are taken as the client signals of the transport network OTN, and the channel layer of the transport network OTN actually becomes a service layer of the data stream signals of the transmission convergence layer, thus enabling the transparent transport of the data stream signals of the transmission convergence layer in the transport network OTN. Also the data signals in the PON become the service signals of the OTN, thus the application of the OTN network is extended from a metropolitan area network to an access network.

Moreover, the ONU is not connected directly with the OLT, but a connection between the ONU and the OLT is enabled through the transport network OTN. Such a networking way increases an access radius of the PON by means of the OTN, and thus it is possible to both overcome problems of a short PON transport distance and a limited coverage range, and reduce the number of OLTs, so that a support for multiple users can be achieved. Furthermore, centralized management of the PON OLT devices is achieved at a level-2 central office (CO2), so that the operation and maintenance cost of the passive optical network is reduced.

Furthermore, due to the use of the new networking manner, the forms of the OTN devices and the PON devices may be adapted, thus making the integration more natural and reasonable and the management more convenient.

Still furthermore, a protection function of the OTN may be also used for a segment protection of the GPON. Because the PON can be protected only in a physical networking manner, such as double-device backup and double lines, it may be expensive. The protection function of the OTN can greatly improve the reliability of the PON (e.g. GPON) networking.

It shall be noted that the above embodiments are merely intended to be illustrative of but not limiting the technical solutions of the present invention. Although the invention has been described in detail with reference to the preferred embodiments of the present invention, it shall be acknowledged by those skilled in the art that various modifications and variations can be made to the embodiments of the present invention without departing from the spirit of the invention, and shall be encompassed in the scope of the present invention as defined in the attached claims.

What is claimed is:

1. A device for transporting optical network signals, comprising:
    an optical-to-electric conversion unit, adapted to convert upstream burst optical signals with a PON frame format as received into upstream electric signals, wherein upstream burst optical signals each have a different clock phase, and there is no optical power between the upstream burst optical signals;
    a receiving and processing unit, adapted to phase adjust the upstream electric signals from the optical-to-electric conversion unit into the upstream electric signals with a uniform bit or byte clock, and to convert the upstream electric signals into upstream data streams;
    an upstream optical channel data unit mapping module, adapted to map the upstream data streams from the receiving and processing unit to upstream optical channel data unit signals; and
    an upstream optical channel transport unit module, adapted to convert the upstream optical channel data unit signals from the upstream optical channel data unit mapping module into upstream signals with an optical channel transport unit format, and to transport the upstream signals with the optical channel transport unit format to an optical transport network.

2. The device according to claim 1, wherein the receiving and processing unit comprises:
    a multi-phase receiving and processing unit, adapted to adjust in a serial way the upstream electric signals with a random phase from the optical-to-electric conversion unit into the upstream electric signals with a uniform bit or byte clock, and to convert the upstream electric signals into parallel upstream data streams;
    or
    an upstream burst receiving and processing unit, adapted to re-delimit burst packets of the upstream electric signals from the optical-to-electric conversion unit, to adjust the burst packets into burst packets with a uniform bit or byte clock, and to recover the upstream data streams from preamble byte signals of the burst packets.

3. The device according to claim 2, further comprising:
    a downstream optical channel transport unit module, adapted to convert downstream signals with an optical channel transport unit format from the optical transport network into downstream optical channel data unit signals;
    a downstream optical channel data unit de-mapping module, adapted to de-map the downstream optical channel data unit signals from the downstream optical channel transport unit module to downstream frame data streams with a PON frame format; and
    a downstream conversion interface module, adapted to convert the downstream frame data streams from the downstream optical channel data unit mapping module into downstream optical signals, and to transport the downstream optical signals to a PON.

4. The device according to claim 3, wherein the downstream conversion interface module comprises:
a parallel-to-serial conversion unit, adapted to parallel-to-serial convert the downstream frame data streams from the downstream optical channel data unit mapping module into downstream electric signals; and
an electric-to-optical conversion unit, adapted to convert the downstream electric signals from the parallel-to-serial conversion unit into the downstream optical signals, and to transport the downstream optical signals to the PON.

5. The device according to claim 1, further comprising:
a downstream optical channel transport unit module, adapted to convert downstream signals with an optical channel transport unit format from the optical transport network into downstream optical channel data unit signals;
a downstream optical channel data unit de-mapping module, adapted to de-map the downstream optical channel data unit signals from the downstream optical channel transport unit module to downstream frame data streams with a PON frame format; and
a downstream conversion interface module, adapted to convert the downstream frame data streams from the downstream optical channel data unit mapping module into downstream optical signals, and to transport the downstream optical signals to a PON.

6. The device according to claim 5, wherein the downstream conversion interface module comprises:
a parallel-to-serial conversion unit, adapted to parallel-to-serial convert the downstream frame data streams from the downstream optical channel data unit mapping module into downstream electric signals; and
an electric-to-optical conversion unit, adapted to convert the downstream electric signals from the parallel-to-serial conversion unit into the downstream optical signals, and to transport the downstream optical signals to the PON.

7. A system for transporting signals through a passive optical network, comprising a device for transporting optical network signals and a device for transporting optical line signals, which are connected through an optical transport network, wherein:
the device for transporting optical network signals comprises: an optical-to-electric conversion unit, a receiving and processing unit, an upstream burst optical channel data unit mapping module, and an upstream optical channel transport unit module;
wherein the optical-to-electric conversion unit is adapted to convert the upstream burst optical signals with a PON frame format as received into upstream electric signals;
the receiving and processing unit is adapted to phase adjust the upstream electric signals from the optical-to-electric conversion unit into upstream electric signals with a uniform bit or byte clock, and to convert the upstream electric signals into the upstream data streams;
the upstream burst optical channel data unit mapping module is adapted to map the upstream data streams from the receiving and processing unit to upstream optical channel data unit signals; and the upstream optical channel transport unit module is adapted to convert the upstream optical channel data unit signals from the upstream optical channel data unit mapping module into upstream signals with an optical channel transport unit format, and to transport the upstream signals with an optical channel transport unit format to an optical transport network; and the device for transporting optical line signals is adapted to convert the upstream signals with an optical channel transport unit format from the optical transport network into upstream optical channel data unit signals, to de-map the upstream optical channel data unit signals to upstream optical signals with a PON frame format, and to transport the upstream optical signals with a PON frame format to an optical line terminal; and to process downstream signals in a reverse direction to the upstream processing.

8. The system according to claim 7, wherein the upstream optical signals with a PON frame format received by the device for transporting optical network signals are upstream optical signals from an optical network unit, and the system further comprises the optical network unit connected with the device for transporting optical network signals through a passive optical distribution network and the optical line terminal, wherein
the optical line terminal, connected with the device for transporting optical line signals through an optical fiber, is adapted to de-map the upstream optical signals from the device for transporting optical line signals to PON internal frames, and to recover upstream service signals required for transport to a networking serving part from the PON internal frames; and to perform the downstream processing in a reverse direction to the upstream processing.

9. The system according to claim 7, wherein:
the device for transporting optical line signals comprises:
an upstream optical channel transport unit module, adapted to convert the upstream signals with an optical channel transport unit format from the optical transport network into the upstream optical channel data unit signals; an upstream optical channel data unit mapping module, adapted to de-map the upstream optical channel data unit signals from the upstream optical channel transport unit module to the upstream data streams with a PON frame format; an upstream conversion interface module, adapted to convert the upstream data streams from the upstream optical channel data unit mapping module into upstream optical signals, and to transport the upstream optical signals to the optical line terminal; and
a downstream conversion interface module, adapted to convert the downstream optical signals from the optical line terminal into downstream frame data streams with a PON frame format; a downstream optical channel data unit mapping module, adapted to map the downstream frame data streams from the downstream conversion interface module to downstream optical channel data unit signals; a downstream optical channel transport unit module, adapted to convert the downstream optical channel data unit signals from the downstream optical channel data unit mapping module into downstream signals with an optical channel transport unit format, and to transport the downstream signals with an optical channel transport unit format to the device for transporting optical network signals through the optical transport network.

10. The system according to claim 9, the device for transporting optical line signals further comprises:
a downstream optical channel data unit cross-connecting module, located between the downstream optical channel data unit mapping module and the downstream optical channel transport unit module, adapted to cross-schedule a plurality of sets of downstream optical channel data unit signals from the downstream optical channel data unit mapping module, and to transport the plurality of sets of downstream optical channel data unit signals to the downstream optical channel transport unit module.

11. The system according to claim 9, wherein the downstream signals as received by the downstream conversion interface module are downstream service signals from a network serving party, and the downstream conversion interface module comprises:

a downstream service adaptation unit, adapted to adapt downstream service signals from the network serving party into downstream PON internal frames; and a downstream transmission convergence unit, adapted to multiplex, and assemble the downstream PON internal frames with a frame format of a downstream transmission convergence layer, to form downstream frame data streams with a frame format of the downstream transmission convergence layer.

12. A method for transporting signals through a passive optical network, comprising:

converting the upstream burst optical signals with a PON frame format as received into upstream electric signals, by an optical-to-electric conversion unit;

phase adjusting the upstream electric signals from the optical-to-electric conversion unit into upstream electric signals with a uniform bit or byte clock, and converting the upstream electric signals into the upstream data streams, by a receiving and processing unit;

mapping the upstream data streams from the receiving and processing unit to upstream optical channel data unit signals, by an upstream optical channel data unit mapping module; and converting the upstream optical channel data unit signals from the upstream optical channel data unit mapping module into upstream signals with an optical channel transport unit format, and to transport the upstream signals with an optical channel transport unit format to an optical transport network, by an upstream optical channel transport unit module; and converting the upstream signals with an optical channel transport unit format received from the optical transport network into upstream optical channel data unit signals, de-mapping the upstream optical channel data unit signals to upstream optical signals with a PON frame format, and transporting the upstream optical signals with a PON frame format to an optical line terminal.

13. The method according to claim 12, wherein the mapping the upstream data streams from the receiving and processing unit to upstream optical channel data unit signals by an upstream optical channel data unit mapping module comprises: dividing upstream channel timeslots of the optical channel data unit signals dependent upon a rate of the upstream optical signals; and mapping the upstream data streams into the respective upstream channel timeslots.

14. The method according to claim 12, further comprising: de-mapping, by the optical line terminal, the upstream optical signals to PON internal frames, recovering upstream service signals from the PON internal frames, and transporting the upstream service signals to a network serving party.

15. The method according to claim 12, further comprising:

mapping downstream optical signals with a PON frame format from an optical line terminal, as client signals, to downstream optical channel data unit signals, converting the downstream optical channel data unit signals into downstream signals with an optical channel transport unit format, and transporting the downstream signals with an optical channel transport unit format through an optical transport network; and converting the downstream signals with an optical channel transport unit format received from the optical transport network into downstream optical channel data unit signals, de-mapping the downstream optical channel data unit signals to downstream optical signals with a PON frame format, and transporting the downstream optical signals with a PON frame format to an optical network unit.

* * * * *